United States Patent
Deb et al.

(10) Patent No.: US 12,489,707 B1
(45) Date of Patent: Dec. 2, 2025

(54) MODIFICATION OF ROUTING AND FORWARDING INFORMATION FOR CLOUD NETWORK TRAFFIC USING CUSTOMER-SPECIFIED RULES

(71) Applicant: Amazon Technologies, Inc., Seattle, WA (US)

(72) Inventors: Bashuman Deb, Aldie, VA (US); Shridhar Kulkarni, Seattle, WA (US); Brandon Michael LaRue, Alexandria, VA (US); Omer Hashmi, Bethseda, MD (US); Sandeep Bajaj, San Ramon, CA (US); Ramin Ali Dousti, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 349 days.

(21) Appl. No.: 18/339,189

(22) Filed: Jun. 21, 2023

(51) Int. Cl.
| | |
|---|---|
| H04L 12/715 | (2013.01) |
| G06F 8/65 | (2018.01) |
| H04L 12/26 | (2006.01) |
| H04L 29/08 | (2006.01) |
| H04L 45/02 | (2022.01) |
| H04L 45/76 | (2022.01) |

(52) U.S. Cl.
CPC ............. H04L 45/76 (2022.05); H04L 45/04 (2013.01)

(58) Field of Classification Search
CPC ..... H04L 45/76; H04L 43/0817; H04L 43/08; H04L 41/0654; H04L 43/065; H04L 43/16; H04L 69/326; H04L 67/10; H04L 67/141; H04L 67/28; H04L 12/4641; H04L 41/0823; H04L 63/0272; H04L 67/56; H04L 45/124; H04L 45/04; H04L 45/02; H04L 45/42; H04L 45/46; G06F 8/65

USPC ........................................................ 370/389
See application file for complete search history.

(56) References Cited

U.S. PATENT DOCUMENTS

| | | |
|---|---|---|
| 6,006,272 A | 12/1999 | Aravamudan et al. |
| 6,993,021 B1 | 1/2006 | Chuah et al. |
| 7,274,706 B1 | 9/2007 | Nguyen |
| 7,468,956 B1 | 12/2008 | Leelanivas |
| 7,782,782 B1 | 8/2010 | Ferguson et al. |

(Continued)

OTHER PUBLICATIONS

Albert Greenberg, et al "VL2: A Scalable and Flexible Data Center Network" Communications of the ACM, vol. 54, No. 3, Mar. 2011, pp. 1-10.

(Continued)

*Primary Examiner* — Sithu Ko
*Assistant Examiner* — Anneilian Lalchinthang
(74) *Attorney, Agent, or Firm* — Robert C. Kowert; Kowert, Hood, Munyon, Rankin & Goetzel, P.C.

(57) ABSTRACT

Routing metadata, to be used at a transit gateway to transmit packets among a plurality of networks, is obtained from several routing information sources at a route processing node of a connectivity service. The node applies a rule to a subset of the metadata to generate at least a portion of a routing information base, with the first rule indicating a matching criterion for selecting the subset, as well as a mutation to be implemented with respect to the subset. A packet forwarding node of the connectivity service obtains at least a portion of a forwarding information base (FIB) generated by the node from the RIB, and transmits a data packet received at the transit gateway to a next hop destination indicated in the FIB.

20 Claims, 12 Drawing Sheets

(56) References Cited

U.S. PATENT DOCUMENTS

| | | | |
|---|---|---|---|
| 7,865,586 B2 | 1/2011 | Cohn | |
| 7,869,442 B1 | 1/2011 | Kamboh | |
| 8,244,909 B1 | 8/2012 | Hanson et al. | |
| 8,331,371 B2 | 12/2012 | Judge et al. | |
| 8,358,658 B2 | 1/2013 | Flynn et al. | |
| 8,478,896 B2 | 7/2013 | Ehlers | |
| 8,693,470 B1 | 4/2014 | Maxwell et al. | |
| 9,356,866 B1 | 5/2016 | Sivaramakrishnan et al. | |
| 9,935,829 B1 | 4/2018 | Miller | |
| 10,057,157 B2 | 8/2018 | Goliya | |
| 10,110,431 B2 | 10/2018 | Ganichev | |
| 10,263,840 B2 * | 4/2019 | Mudigonda | H04L 67/34 |
| 10,355,989 B1 | 7/2019 | Panchal et al. | |
| 10,382,401 B1 | 8/2019 | Lee | |
| 10,411,955 B2 | 9/2019 | Neginhal | |
| 10,623,285 B1 * | 4/2020 | Shevade | H04L 41/0654 |
| 10,742,446 B2 | 8/2020 | Tillotson et al. | |
| 10,742,554 B2 | 8/2020 | Deb et al. | |
| 10,757,009 B2 | 8/2020 | Deb et al. | |
| 10,785,146 B2 | 9/2020 | Tillotson et al. | |
| 10,797,989 B2 | 10/2020 | Tillotson et al. | |
| 10,797,998 B2 | 10/2020 | Basavaraj | |
| 10,834,044 B2 | 11/2020 | Tillotson et al. | |
| 10,893,004 B2 | 1/2021 | Tillotson et al. | |
| 10,897,417 B2 | 1/2021 | Tillotson et al. | |
| 10,999,137 B2 | 5/2021 | Cidon | |
| 11,102,079 B2 | 8/2021 | Nahar | |
| 11,228,641 B1 | 1/2022 | Wagner | |
| 11,310,155 B1 * | 4/2022 | Qian | H04L 45/123 |
| 11,451,467 B2 | 9/2022 | Bashuman et al. | |
| 11,456,894 B1 * | 9/2022 | Sundararajan | H04L 12/4645 |
| 11,469,998 B2 | 10/2022 | Sanghvi | |
| 11,601,365 B2 | 3/2023 | Qian et al. | |
| 12,047,280 B1 * | 7/2024 | Wei | H04L 45/3065 |
| 2002/0116501 A1 | 8/2002 | Ho | |
| 2003/0051163 A1 | 3/2003 | Bidaud | |
| 2005/0152284 A1 | 7/2005 | Kotha | |
| 2006/0198298 A1 | 9/2006 | Bhogavilli | |
| 2008/0225875 A1 | 9/2008 | Wray et al. | |
| 2009/0304004 A1 | 12/2009 | Huynh Van | |
| 2010/0040069 A1 | 2/2010 | Johri | |
| 2010/0043068 A1 | 2/2010 | Varadhan et al. | |
| 2010/0309839 A1 | 12/2010 | Goldshtein | |
| 2013/0254766 A1 | 9/2013 | Zuo et al. | |
| 2015/0271268 A1 | 9/2015 | Finkelstein | |
| 2016/0182310 A1 | 6/2016 | Gintis | |
| 2016/0239337 A1 | 8/2016 | Gu | |
| 2016/0261506 A1 | 9/2016 | Hedge | |
| 2017/0063633 A1 | 3/2017 | Goliya | |
| 2017/0093866 A1 | 3/2017 | Ben-Noon | |
| 2017/0177396 A1 | 6/2017 | Palermo et al. | |
| 2018/0041425 A1 | 2/2018 | Zhang | |
| 2018/0091394 A1 | 3/2018 | Richards | |
| 2018/0287905 A1 | 10/2018 | Mehta | |
| 2019/0026082 A1 | 1/2019 | Shalev | |
| 2019/0052604 A1 | 2/2019 | Coleman | |
| 2019/0208008 A1 | 7/2019 | Tan | |
| 2019/0230030 A1 | 7/2019 | Eswara | |
| 2019/0268421 A1 * | 8/2019 | Markuze | H04L 67/10 |
| 2019/0319894 A1 | 10/2019 | Tang | |
| 2019/0392150 A1 | 12/2019 | Shevade | |
| 2020/0092193 A1 * | 3/2020 | Tillotson | H04L 12/4633 |
| 2020/0162362 A1 * | 5/2020 | Deb | H04L 45/04 |
| 2020/0162383 A1 * | 5/2020 | Deb | H04L 45/745 |
| 2020/0204492 A1 * | 6/2020 | Sarva | H04L 67/34 |
| 2020/0274952 A1 | 8/2020 | Waskiewicz | |
| 2021/0359948 A1 | 11/2021 | Durrani | |
| 2022/0286489 A1 | 9/2022 | Trussart | |
| 2022/0321469 A1 | 10/2022 | Qian et al. | |
| 2023/0088858 A1 * | 3/2023 | Tu | H04L 45/02 |
| 2024/0031392 A1 * | 1/2024 | Ahn | H04L 63/1425 |

OTHER PUBLICATIONS

Chuanxiong Guo, et al "BCube: A High Performance, Server-centric Network Architecture for Modular Data Centers" SIGCOMM'Aug. 17-21, 09, pp. 1-12.
"On the Impact of Packet Spraying in Data Center Networks", Advait Dixit, et al., 2013, pp. 1-9.
U.S. Appl. No. 18/190,891, filed Mar. 27, 2023, Shevade, et al.
U.S. Appl. No. 17/385,778, filed Jul. 26, 2021, Meher Aditya Kumar Addepalli.
U.S. Appl. No. 18/160,997, filed Jan. 27, 2023 Baihu Qian, et al.
U.S. Appl. No. 17/218,039, filed Mar. 30, 2021, Bashuman Deb, et al.
U.S. Appl. No. 18/190,888, filed Mar. 27, 2023, Shevade, et al.

* cited by examiner

MODIFICATION OF ROUTING AND FORWARDING INFORMATION FOR CLOUD NETWORK TRAFFIC USING CUSTOMER-SPECIFIED RULES

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine of a cloud provider network to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines. In some cases, respective sets of isolated virtual networks or virtual private clouds may be set up at virtualized computing services of cloud provider network, e.g., to enable logical isolation of groups of customer applications from one another. For some types of applications, customers of cloud provider networks may wish to utilize a combination of their own customer-premise computing resources and isolated virtual networks offered by the cloud provider networks, and connectivity between the different networks may be required.

Figure 1:
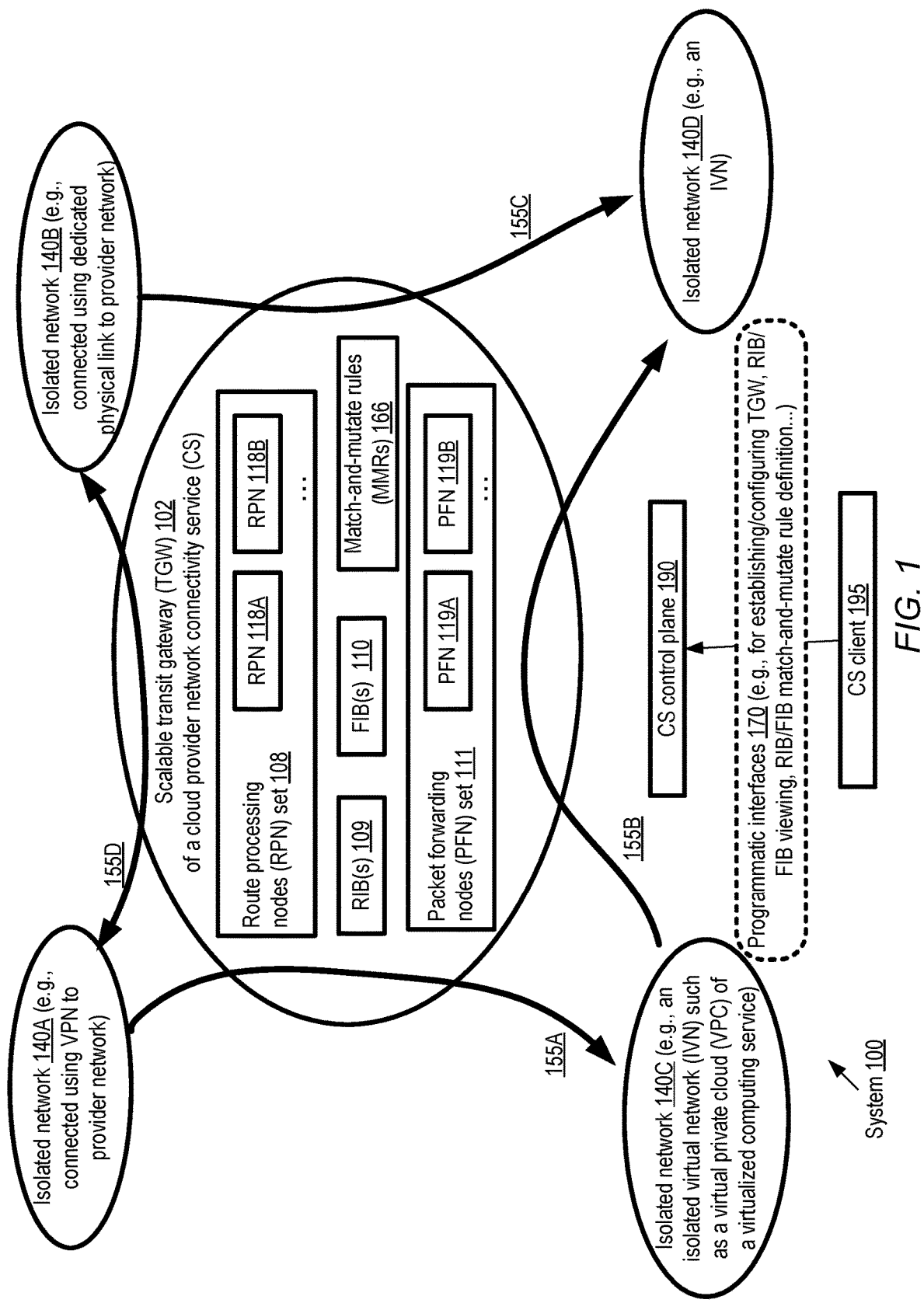
FIG. 1 illustrates an example system environment in which selected entries within routing information bases (RIBs) and forwarding information bases (FIBs), used for transmitting network traffic between various isolated networks by a transit gateway (TGW) of a cloud provider network, may be modified using match-and-mutate rules specified by customers, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for simplifying administration of large-scale networks by enabling the modification, using easy-to-specify match-and-mutate rules, of routing information bases (RIBs) and forwarding information bases (FIBs) maintained at a cloud provider network for transmitting packets between subsets of the large-scale networks. On behalf of a given organization, several isolated virtual networks (IVNs) can be set up using resources of a cloud provider network, with each such IVN for example comprising a respective set of compute instances or virtual machines of a virtualized computing service (VCS) that are used to implement related applications. For example, a respective IVN can be set up for various departments or business units of an organization to run their applications in a scalable and highly-available manner. Furthermore, the organization can include several external premises, such as private data centers, offices and the like, each of which can include servers and other resources that can also be used for some applications. Connectivity between various pairs of isolated networks (including networks set up at the external premises as well as IVNs) can be enabled using a connectivity service (CS) of the cloud provider network, which provides programmatic interfaces for setting up logical routing constructs referred to as transit gateways (TGWs) or virtual traffic hubs (VTHs) for routing packets between the isolated networks.

TGWs include routers that perform packet forwarding. In an IP based router, routing-tables forward traffic between routers. When a packet arrives at receiving router, its destination address is looked-up the router's route-table to determine the packet's next-hop. The next hop is a router or a computer connected to the receiving-router. Whereas individual route-tables are single look-up tables, the software running on TGW routers receives data from multiple data sources (static-route configuration, dynamic-routing protocols, static policy configuration) to create a RIB. Taking this RIB, the router runs a data-processing/decision-process to arrive at the FIB which does the packet forwarding, as described earlier. It also is responsible for advertising routes to other connected components over network protocols like BGP (Border Gateway Protocol).

The techniques introduced herein enable TGW customers to centralize and simplify TGW RIB and FIB administration using match-and-mutate rules. Routes from which RIBs and FIBs are derived can be received for a given TGW from a dynamically changing mix of sources, including BGP engines within on-premise networks connected via VPNs (virtual private networks) or direct physical links, IVN attachments, and the like. For a given cloud computing environment customer with a TGW, new on-premise networks with legacy BGP engines may be added (e.g., as a result of a corporate merger) over time, and new IVNs may be attached to the TGW. It can be difficult for the TGW administrator or owner to influence the output of some routing information sources directly. This can lead to difficulty resolving problems like security issues related to advertisement of stale routes, enforcing dynamic routing policies, setting up firewall attachments as next hops, modifying BGP advertisements sent out from TGWs, etc. In the proposed approach, schemas for TGW RIBs and FIBs are presented to the TGW administrator, enabling the administrator to view RIBs/FIBs as logical tables with a fixed set of attributes, with some attributes designated as mutable and others as immutable. The TGW administrators can define match-and-mutate rules for the RIBs and FIBs, indicating the kinds of changes they want made to RIB and FIB entries for routes that match specified criteria (e.g., they can drop routes that have specified BGP properties, cause firewall appliances to be inserted as next hops for packets from selected sources, prepend autonomous system (AS) paths to selected routes before route advertisement, etc.) TGW routing and forwarding information can thereby be cleanly and centrally controlled based on policies selected by the TGW administrators.

By programmatically attaching various isolated networks to a given TGW, setting up one or more route tables at the TGW, and propagating routes from various sources of routing metadata to the route tables (and associated dynamically constructed RIBs and FIBs), TGWs can be used to flexibly manage the flow of traffic between specified groups of isolated networks. A RIB of a TGW comprises a set of route entries associated with a given route table (or a set of route tables) of the TGW, while a FIB comprises a set of forwarding entries, derived from a corresponding RIB, that are used to transmit packets received at the TGW to their next hop destinations. A RIB can potentially contain several entries, obtained for example from distinct routing metadata information sources, that each indicate respective paths for transmission of packets towards a particular set of destination addresses; the corresponding FIB can contain just one of the entries, selected from the multiple entries of the RIB using a RIB-to-FIB conversion algorithm of the CS. A CS can comprise a set of route processing nodes (RPNs) as well as a set of packet forwarding nodes (PFNs). RPNs associated with or assigned to a given TGW can receive routing metadata from various routing metadata sources, and generate corresponding RIBs and FIBs; the PFNs assigned to the TGW can use the FIBs to forward data packets received at the TGW from data packet sources. The RPNs can also be referred to collectively as a distributed route processing engine (RPE), and IVNs can be referred to as virtual private clouds or VPCs.

Over time, as indicated above, new IVNs and/or on-premise networks can be added to the organization's overall network (e.g., as a result of a merger or acquisition of another organization), configurations of the IVNs or on-premise networks can change, and so on. In general, depending for example on the size of the organization, the amount of routing-related metadata that is obtained for RIBs and FIBs can become quite large and potentially hard to fully understand, even for seasoned network administrators. In particular, in the cloud context, information about IVNs, TGW attachments and the like can also be indicated in the routing-related metadata, so the complexity of the routing and forwarding information in use at a given TGW can be even greater than the complexity of similar information used at gateways and routers of networks that do not include cloud resources. Furthermore, in some cases, routing metadata sources (e.g., Border Gateway Protocol (BGP) routers set up long ago by local administrators of on-premise networks of a newly-acquired organization) may not be easy to modify by an administrator of a TGW at which routing metadata from the sources is to be received and processed.

To help simplify the management of routing metadata received from a wide variety of sources, a CS can present the schemas used for RIBs and FIBs of TGWs to customers. The schemas can in effect enable CS customers, such as organizations' networking administrators in charge of managing various TGWs, to view the RIBs and FIBs as the logical equivalent of database tables. Note that in some cases RIBs and/or FIBs can be implemented as dynamically changing in-memory data structures, with hundreds or thousands of new routing metadata changes being reflected in the RIBs/FIBs every few seconds, so a physical table in persistent storage need not be used for a RIB or a FIB. In other cases, at least some versions of RIBs or FIBs can be stored in persistent storage. The schemas provided by the CS can indicate the respective fields or columns utilized at the connectivity service for respective properties of the RIB and FIB entries, including for example the particular routing metadata source whose metadata was used to populate a given RIB or FIB entry, the types of TGW attachments to which the RIB or FIB entry applies, various BGP parameters associated with the entries and so on.

In the schemas, some fields of the RIB/FIB entries (such as route prefixes, or fields indicating routing information sources) can be designated as immutable, while other fields (such as BGP properties of the entries) can be designated as mutable. The immutable fields may, for example, indicate facts about events that have already occurred, such as past transmissions of routing metadata from a particular source, so modifying such fields may not be beneficial even if such modifications were permitted. The schemas can thus indicate which portions or fields of a RIB or a FIB can be modified, and which cannot. CS customers can also provide match-and-mutate rules (MMRs) which can be applied to RIB and/or FIB entries, e.g., to enforce various policies of the organization. A given MMR for a RIB can include one or more matching criteria for selecting a particular subset of routing metadata from which a RIB is derived, as well as one or more mutations or transformations to be applied to the routing metadata (e.g., changing one or more BGP properties) to generate a RIB entry. Similarly, a given MMR for a FIB can include one or more matching criteria for selecting RIB entries or routes (obtained potentially from versions of the RIBs that have themselves been modified using a RIB MMR), and one or more mutations or transformations to be applied to the selected RIB entries to generate a corresponding FIB entry or to decide parameters of the propagation or advertisement of the FIB entry. Such MMRs can be used to enforce a variety of policies by a TGW administrator (a customer of the CS), such as a requirement to prioritize routes advertised by one routing information source above potentially conflicting routes advertised by another routing information source, ensuring that all the packets sent from a particular isolated network pass through a logical firewall, and so on. Using the schemas and MMRs, TGW administrators can maintain centralized control over the manner in which information obtained from diverse routing information sources is utilized to route and forward traffic by a TGW (without for example having to modify the behavior of the routing information sources themselves). As and when new IVNs are created or deleted on behalf of an organization, new on-premise networks are added or removed, or configurations of existing IVNs and on-premise networks are modified, the rules set up by a TGW administrator using the programmatic interfaces provided by the CS can ensure that networking-related policies of the organization are enforced with relative ease. The TGW administrator can also examine up-to-date easy-to-understand views of the RIBs and FIBs being used for the traffic of the organization.

As one skilled in the art will appreciate in light of this disclosure, certain embodiments may be capable of achieving various advantages, including some or all of the following: (a) providing a centralized easy-to-use mechanism for specifying policies (including security-related policies) pertaining to routing of network traffic of complex networks which include a diverse and dynamically changing mix of cloud resources and on-premise resources, thereby reducing the probability that the policies are violated and/or (b) enhancing the user experience of administrators and support engineers of such complex networks, e.g., by providing views of RIBs and FIBs as they change, along with logs and metrics associated with the definition and application of the policies on the RIBs and FIBs.

According to some embodiments, a system may comprise one or more route processing nodes (RPNs) of a CS of a cloud provider network, as well as one or more data packet forwarding nodes (PFNs) of the CS. The CS may also be referred to as a software-defined networking service, a network function virtualization service, a virtualized network function service, or simply a networking service. An RPN of the CS may be configured to obtain, from a plurality of routing information sources, routing metadata to be utilized at a TGW of the CS for transmitting network packets between various isolated networks. Any of several different types of routing information sources may send their routing metadata to the RPN, including for example include a BGP route advertisement generator (e.g., a router which comprises a BGP engine) and a VPC network address range provider (e.g., a control plane server of a VCS at which VPS or IVNs are established on behalf of customers).

The RPN may generate, from the routing metadata, at least one version of a RIB of the TGW in various embodiments. To generate the RIB, in some embodiments the RPN may apply a first rule (referred to as a match-and-modify rule or MMR) to a subset of the routing metadata to obtain a modified version of the subset which is included in the RIB. The first rule may be obtained via one or more programmatic interfaces at the CS from a customer on whose behalf the TGW is established (e.g., an administrator or owner of the TGW). The first rule may indicate (a) a first matching criterion which is used to select the subset of the routing metadata and (b) a first mutation (such as a change of one or more properties, or a decision to reject at least a portion of the selected metadata entirely from the RIB) to be implemented with respect to the subset.

In at least some embodiments, the RPN may generate, from a first version of a particular route indicated in an entry of the RIB produced using the first rule, a second version of the particular route. The second version of the particular route may be generated for inclusion in one or more versions of a FIB of the TGW. The second version may be generated by the RPN by applying a second rule obtained programmatically at the CS from the customer in some embodiments. The second rule may indicate (a) a second matching criterion to be used to implement a second mutation with respect to the particular route and (b) the second mutation itself. The second version of the route may be transmitted or advertised from the TGW to a routing metadata recipient external to the TGW (such as another TGW, or a router participating in a BGP session with the TGW) in some embodiments.

A PFN of the CS, assigned to the TGW, may obtain at least a portion of a FIB (e.g., a FIB which was generated using the second rule) from the RPN in various embodiments. The portion of the FIB received at the PFN may indicate a next hop destination to which a data packet received at the TGW is to be forwarded. The PFN may forward one or more data packets received at the TGW to that next hop destination.

The matching criteria used for selecting the routing metadata subset (in the case of RIB MMRs) or the RIB subsets (in the case of FIB MMRs) to which the mutations of the MMRs are to be applied may be expressed using values of various attributes in different embodiments. For example, in some embodiments, the matching criteria may be expressed as logical or Boolean combinations of predicates (separated using AND or OR operators, or with a NOT operator), with each predicate indicating one or more of: (a) a property of a route prefix, (b) an identifier of a network of a plurality of isolated networks for whose traffic the TGW is set up, (c) an identifier of a routing information source, (d) an attachment category of a plurality of attachment categories which can be used to programmatically isolated networks to the TGW, (e) a BGP attribute, or (f) a network address of a participant in a routing information exchange session and the like.

Any combination of the mutable fields of RIB or FIB entries (as indicated in the corresponding schemas) may be modified by the mutation indicated in a given MMR in various embodiments. For example, a given mutation may indicate a change to one or more of: (a) an autonomous system (AS) path, (b) an administrative distance, (c) a local preference, or (d) a community tag. In some embodiments, the mutation may comprise an action performed with respect to a RIB entry or a FIB entry which matches the criteria indicated in an MMR—e.g., some entries that satisfy the matching criteria may be deleted instead of being included or retained in a RIB or FIB.

In some embodiments, a customer of the CS may submit a programmatic request to the CS to create a TGW routing/forwarding information modification map (RFIMM) which includes several different MMRs to which respective relative priorities may be assigned by the customer. An RFIMM may represent a logical container within which several related MMRs are included. The relative priorities may be assigned to the different MMRs to indicate the sequence in which the different MMRs should be applied to a corresponding set of input (with the input comprising raw routing metadata in the case of RIB MMRs, and the input comprising RIB entries in the case if FIB MMRs). The customer may use one programmatic interface of the CS to first create a RFIMM associated with a given TGW or a set of TGWs, and then use other programmatic interfaces to associate RFIMMs with respective route tables of the TGW in some embodiments. In at least one embodiment, MMRs may be specified without first creating an RFIMM within which the MMR is included. Individual MMRs may be associated with respective route tables of a TGW in some embodiments based on programmatic input. In some embodiments, a number of other programmatic interfaces associated with RFIMMs and MMRs may be supported by a CS, such as requests to view RIB/FIB schemas, requests to list MMRs applicable to a route table or to an entire TGW, and so on.

In at least some embodiments, a CS may comprise a distributed and highly-available fleet of RPNs, with individual ones of the RPNs for example comprising one or more processes or threads running within a virtual or physical machine of the cloud provider network. Similarly, the CS may comprise a distributed and highly-available fleet of PFNs in some embodiments, with individual ones of the PFNs for example comprising one or more processes or threads running within a virtual or physical machine of the cloud provider network. In some embodiments, the CS may also include a set of control plane or administrative nodes (CPNs), which may for example receive TGW configuration-related requests via programmatic interfaces from customers and implement requested actions. Such control plane nodes may cause the RIB and FIB schemas to be presented to authorized entities in response to programmatic requests in one embodiment.

According to some embodiments, at least a subset of the RPNs, PFNs and/or CPNs of a CS may be configured in multi-tenant mode. As such, a given RPN, PFN or CPN may be assigned to multiple TGWs set up on behalf of different CS customers (or multiple TGWs set up on behalf of a single CS customer). In other embodiments, e.g., in response to programmatic requests from CS customers, at least some RPNs and/or PFNs may be configured in single tenant mode and be utilized for only a single TGW or a dingle customer's TGWs.

In at least some embodiments, as indicated above, a CS may be implemented as one of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS, which may be utilized for implementing nodes of the CS, may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the CS and the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS and the CS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

In some embodiments, resources of the cloud provider network may be used to run software containers on behalf of clients. A software container represents a logical packaging of a software application that abstracts an application from the computing environment in which the application is executed. For example, a containerized version of a software application can include the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. The orchestration of such containerized applications may be conducted by a container management service or a container orchestration service of the provider network.

The traffic and operations of the cloud provider network (or individual services of the cloud provider network, including the CS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources.

Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which selected entries within routing information bases (RIBs) and forwarding information bases (FIBs), used for transmitting network traffic between various isolated networks by a transit gateway (TGW) of a cloud provider network, may be modified using match-and-mutate rules specified by customers, according to at least some embodiments. As shown, system 100 comprises a scalable TGW set up using a cloud provider network's connectivity service (CS). The TGW 102 may comprise an RPN set 108 comprising one or more RPNs such as RPN 118A or RPN 118B, as well as a PFN set 111 comprising one or more PFNs such as PFN 119A or PFN 119B. The TGW 102 may be used to enable connectivity among a plurality of isolated networks 140A-140D. The RPNs may receive routing metadata from various sources in the depicted embodiment, pertaining to resources at various isolated networks such as isolated network 140A-140D, and use the routing metadata to populate one or more route tables, RIB(s) 109 and FIB(s) 110 of the TGW (with the RIBs being populated based on the received routing metadata, and the FIBs being derived from the RIBs). The FIBs may then be utilized by PFNs 119 to transmit packets received at the TGW 102 from the different isolated networks to the next hop destinations specified in the FIBs (e.g., along paths to other isolated networks, or along paths to destinations in other network such as the Internet).

The CS may include an administrative or control plane 190 in the depicted embodiment, comprising a set of control plane nodes or control plane servers. The data plane of the CS may include at least the PFNs. The control plane 190 may implement a set of programmatic interfaces 170 in the depicted embodiment, such as one or more web-based consoles, graphical user interfaces, command line tools, and/or application programming interfaces (APIs) which can be used by CS clients 195 (such as administrators or owners of the TGW 102) to submit various kinds of requests and messages pertaining to the client's TGWs, and to receive corresponding responses. For example, clients may submit requests to establish TGWs, programmatically attach various isolated networks to a TGW, set up route tables of the TGW, view the schemas of RIBs/FIBs of the TGW, view the entries in the RIBs/FIBs, define match-and-mutate rules (MMRs) to be used to modify the contents of RIBs/FIBs, and so on.

In one embodiment, at least a portion of the routing information used to populate the RIBs/FIBs may be provided by CS clients directly or indirectly using the programmatic interfaces 170, and conveyed to the RPNs from the CS control plane. For example, a client may use the programmatic interfaces to request that an isolated virtual network (IVN) comprising resources of a virtualized computing service (VCS) of the cloud provider network, be programmatically attached to TGW 102. In such a scenario, the VCS control plane may automatically provide routing metadata (e.g., including the address ranges available for assignment to compute instances within the IVN, which may be sources or destinations of traffic handled by the TGW) to the RPNs. As such the VCS control plane may act as a VPC network address range provider to the RPNs. Other types of routing metadata may be obtained at the RPNs via BGP sessions set up between the TGW and BGP route advertisement generators (such as routers which include BGP processing engines, within or outside the provider network) in various isolated networks, or from messages sent by CS clients. In some embodiments, a CS client may specify static routes for a TGW using one or more programmatic interfaces. A different set of programmatic interfaces than the client-accessible programmatic interfaces 170 may be supported by the CS to enable routing metadata to be provided to the RPNs from some routing information sources in one embodiment.

Connectivity among a number of different types of isolated networks 140 may be provided using a TGW 102 in the depicted embodiment. For example, isolated network 140A may comprise a set of resources at a data center or premise external to the provider network's own data centers, which may be linked to the provider network using VPN (virtual private network) tunnels or connections that utilize portions of the public Internet in the depicted embodiment. Isolated network 140B may also comprise resources at premises outside the provider network, connected to the provide network via dedicated physical links (which may be referred to as "direct connect" links) in the depicted embodiment. Isolated networks 140C and 140D may comprise respective IVNs (VPCs) set up using resources located at the provider network's data centers in the depicted example scenario. An IVN may comprise a collection of networked resources (including, for example, virtual machines or compute instances) allocated to a given client of the provider network, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for virtual machines may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Similar flexibility may also apply to configuration settings at VPN-connected isolated networks such as 140A, and/or at isolated networks 140B connected via dedicated links to the provider network in the depicted embodiment.

In at least some embodiments, one or more route tables may be set up for TGW 102, e.g., in response to programmatic requests from the CS client. A respective RIB and FIB may be created for individual ones of the route tables in the depicted embodiment; in other embodiments, a common RIB or a common FIB may be created for multiple route tables. A given isolated network 140 may be programmatically associated with a particular route table, e.g., using a first type of programmatic interface (an interface used for the "associate" verb or operation) in the depicted embodiment; such an associated route table may be used for directing at least a subset of outbound packets from the isolated network. In another type of programmatic action, route table entries whose destinations are within a given isolated network 140 may be programmatically propagated/ installed (e.g., using a different interface for propagation or installation of entries into particular tables) into one or more route tables, enabling traffic from other sources to be received at the isolated network. In at least some embodiments, entries with destinations within a particular isolated network such as 140C may be propagated to one or more route tables that are associated with other isolated networks such as 140A or 140B, enabling, for example, traffic to flow along paths 155A from those other isolated networks to 140C. Similarly, one or more entries with destinations within isolated network 140D may be propagated to a route table associated with isolated network 140D, enabling traffic to flow from isolated network 140C to isolated network 140D along path 155B. In general, any desired combination of unidirectional traffic (e.g., as indicated by arrows such as 155A, 155B and 155C) or bi-directional traffic (as indicated by arrow 155D) between a given pair of isolated networks that is programmatically attached to TGW 102 may be enabled by using the appropriate combination of route table associations and route table entry propagations in various embodiments. A wide variety of network flow configurations may thereby be supported in different embodiments, including for example hub-and-spoke configurations in which the TGW is the hub and various isolated networks are the spokes, "isolated silo" configurations in which a first subset of attached isolated networks of the TGW can send packets to one another via the TGW but cannot send packets to other attached isolated networks, and so on.

In the embodiment depicted in FIG. 1, a CS customer or client 195 may indicate one or more MMRs 166 via programmatic interfaces 170, and such MMRs may be used by an RPN to generate at least some RIB and/or FIB entries. For example, a RIB MMR MMR1 specified or defined by the customer may indicate matching criteria to be used to select a subset of the received routing metadata (e.g., the subset obtained from a particular routing information source, the subset which has a particular value for a specified BGP attribute, etc.), and a mutation to be applied to the selected subset. The mutation may be applied to the selected subset of routing metadata, and the results of the mutation may be used to populate one or more RIBs.

From such a mutated RIB (which may be referred to as a rule-based RIB or a rule-modified RIB), a subset of route entries may be selected by an RPN based on a matching criterion indicated in a FIB MMR MMR2 (also provided by the customer via a programmatic interaction to the CS) in the depicted embodiment. A mutation indicated in MMR2 may be applied to the selected subset of the route entries of the RIB, and used to populate a FIB. In at least one embodiment, the modified version of a route, generated using MMR2, may be transmitted or advertised from the TGW to a routing metadata recipient external to the TGW (e.g., a BGP engine running in an isolated network) in various embodiments. In some embodiments, multiple FIB versions may be created from a given RIB as discussed below in further detail, using respective MMRs provided by the client. Note that not all the entries in a given RIB or a given RIB may have been generated using MMRs in some embodiments; some entries may be generated using default logic used for creating RIBs and FIBs at the TGW, without applying customer-specified rules as such.

At least a portion of a FIB generated using one or more MMRs by an RPN may be obtained at a PFN 119. The obtained portion of the FIB may indicate next hop destinations for packets received at the TGW and directed to various target resources in the IVNs. When a data packet is received at the TGW, e.g., from a resource within one of the isolated networks 140, the PFN may forward the data packet to a next hop destination indicated in the portion of the FIB in various embodiments.

Figure 2:
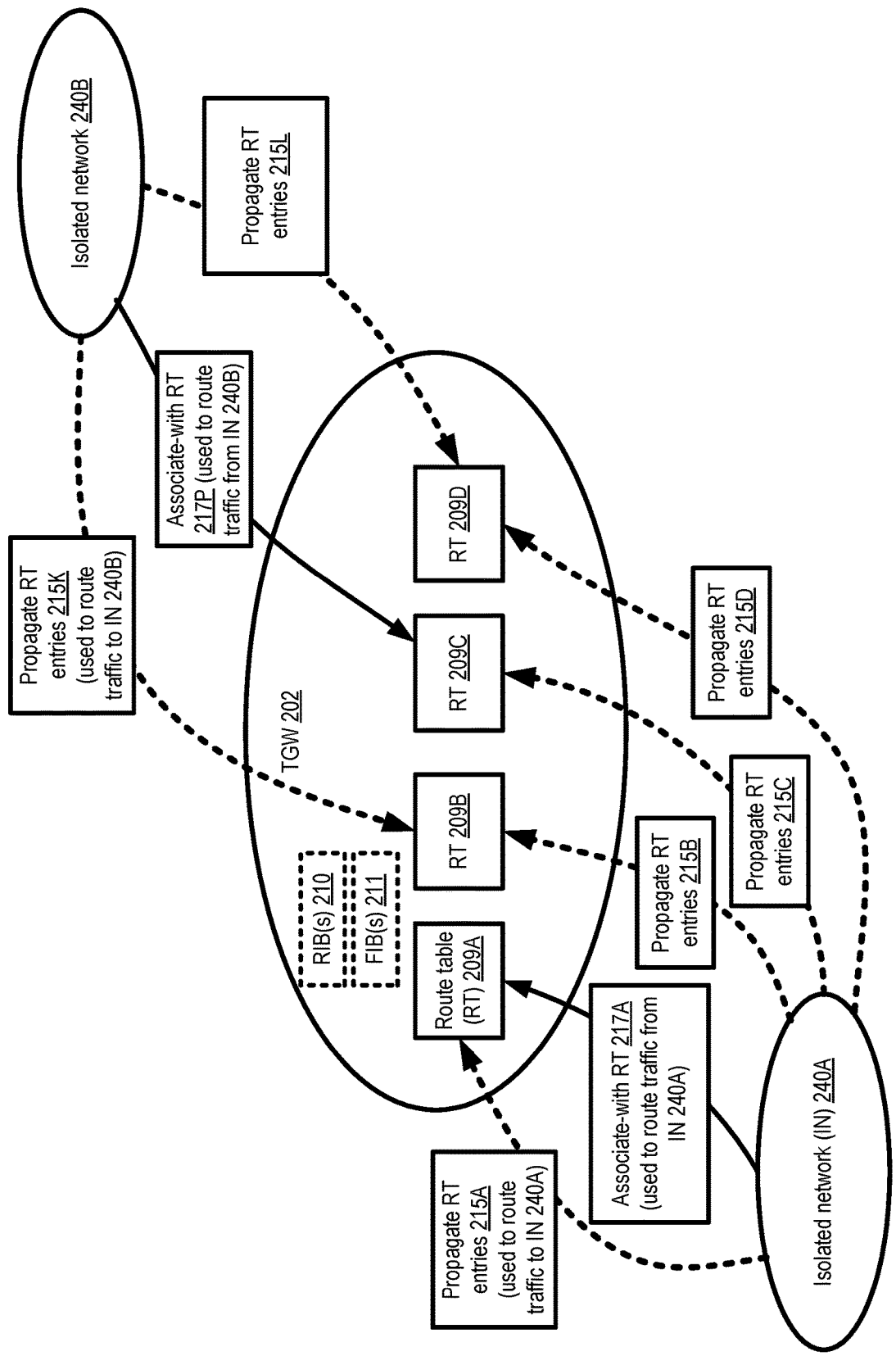
FIG. 2 illustrates an example configuration in which multiple route tables may be created and utilized at a TGW in response to programmatic requests from customers, according to at least some embodiments.

FIG. 2 illustrates an example configuration in which multiple route tables may be created and utilized at a TGW in response to programmatic requests from customers, according to at least some embodiments. As shown, four route tables (RTs) 209A-209D may be created for a TGW 202 in the depicted embodiment, e.g., in response to respective programmatic requests from a CS client on whose behalf TGW 202 is established. Two isolated networks (INs) 240A and 240B may be programmatically attached to the TGW 202. In at least some embodiments, a respective programmatic attachment request may be submitted by the client to attach a given IN to the TGW.

In at least some embodiments, corresponding to each IN which is programmatically attached, one of the RTs of the TGW may be used to populate a RIB 210 and a FIB 211 which can be utilized by the PFNs of the TGW to direct packets received at the TGW from the IN. An "associate-with" interface may be invoked by a CS client (such as the owner/administrator of TGW 202) to indicate the RT for routing outbound traffic from the IN. Thus, for example, RT 209A may be associated with IN 240A via a request 217A (submitted after the IN 240A has been programmatically attached to the TGW 202), and metadata indicating this association may be used to identify the FIB (populated using RT 209A's RIB) to be used to route packets received from IN 240A at the TGW in the depicted embodiment. Similarly, as indicated by the arrow representing request 217P, RT 209C may be programmatically associated with IN 240B, enabling entries stored within RT 209C and its RIB/FIB to be used to route/forward outbound network packets from IN 240B in the depicted embodiment. In some embodiments, a request to programmatically attach an IN to a TGW may include a request to associate that IN with a particular route table. In at least some embodiments, an association request such as 217A or 217P may include an indication of a policy to be used to determine whether a particular set of packets are to be routed using that route table. Such a rule or policy may, for example, include a descriptor such as a 5-tuple (comprising source network address range, source network port range, destination network address range, destination network port range, and network protocol) that can be used to identify the particular packets which are to be routed using a RIB/FIB associated with that route table. Thus, more than one route table may potentially be associated with a particular isolated network such as 240A or 240B, to be used for respective subsets of outbound packets in some embodiments. Using such conditional or filtered association operations, application-specific routing may be supported in at least some embodiments—e.g., outbound database-related traffic originating at an IN 240 may be routed using one associated route table, outbound web-server related traffic originating at the IN 240 may be routed using a second routing table, and so on. In some embodiments, unconditional association requests (which do not specify policies indicating the subset of packets to be routed using the specified table) as well as conditional association requests may be supported by a CS. In other embodiments, only unconditional or only conditional associations may be supported.

In contrast to the associate-with requests 217A and 217P, which indicate which route table should be used for routing outbound packets from a given IN, a different type of programmatic request may be used to propagate specific entries for routing inbound traffic to a given isolated network in the depicted embodiment. Thus, for example, using respective "propagate-RT-entries" requests 215A, 215B, 215C and 215D (which may also be submitted after the IN 240A has been programmatically attached to the TGW 202), one or more route table entries whose destinations lie within isolated network 240A may be included within RTs 209A, 209B, 209C and 209D (and RIBs/FIBs generated for those RTs) in the depicted embodiment. Note that individual ones of the RTs 209A-209D may at least potentially be associated with (and therefore used for outbound traffic from) various other isolated networks, not all of which are shown in FIG. 2. Thus, by selecting which specific RTs should include entries with destinations in IN 240A, the administrator of TGW 202 or IN 240A (or some other entity responsible for propagations 215A-215D) may be able to influence exactly which sets of sources can send packets to IN 240A in the depicted embodiment. One or more RT entries with destinations within isolated network 240B may similarly be propagated to RTs 209B and 209D using propagate-RT-entries requests 215K and 215L in the depicted embodiment, enabling fine-grained control over which sources are allowed to direct traffic to IN 240B. The administrators of the INs that propagate the routes to the RTs may represent one example of routing metadata sources whose input is utilized at the RPNs of the TGW to generate the RIBs and the FIBs.

In at least some embodiments, a given isolated network 240 may have to be associated with one and only one RT 209 to enable outbound traffic to be transmitted from that isolated network; thus, the IN-to-RT-associations may be 1:1 relationships in such embodiments. In other embodiments in which, for example, conditional associations of the kind discussed above are supported, multiple route tables may be associated with a given IN for respective subsets of outbound traffic. In at least some embodiments, route table entries for incoming traffic of a given IN may be propagated to any number of RTs, including for example an RT with which the given IN is also associated. Thus, the IN-to-RT-entry-propagations may be a 1:N relationship, where N>=1, in the depicted embodiment. Note that in some embodiments, several of the operations of (a) programmatically attaching an IN to a TGW, (b) programmatically associating an IN to an RT of the TGW and/or (c) programmatically propagating entries for destinations within an IN to an RT may be performed using a single programmatic request—that is, the three operations need not necessarily require respective types of requests.

In various embodiments, in addition to the "associate-with" and "propagate RT entries" requests, a client of the CS may also submit MMRs of the kind described above via programmatic requests. The MMRs may be used by the RPNs of the TGW to generate modified versions of RIBs/FIBs as described earlier. In some embodiments, individual ones of the MMRs may indicate the specific RT whose RIB or FIB is to be mutated based on the matching criteria indicated in the MMRs.

Figure 3:
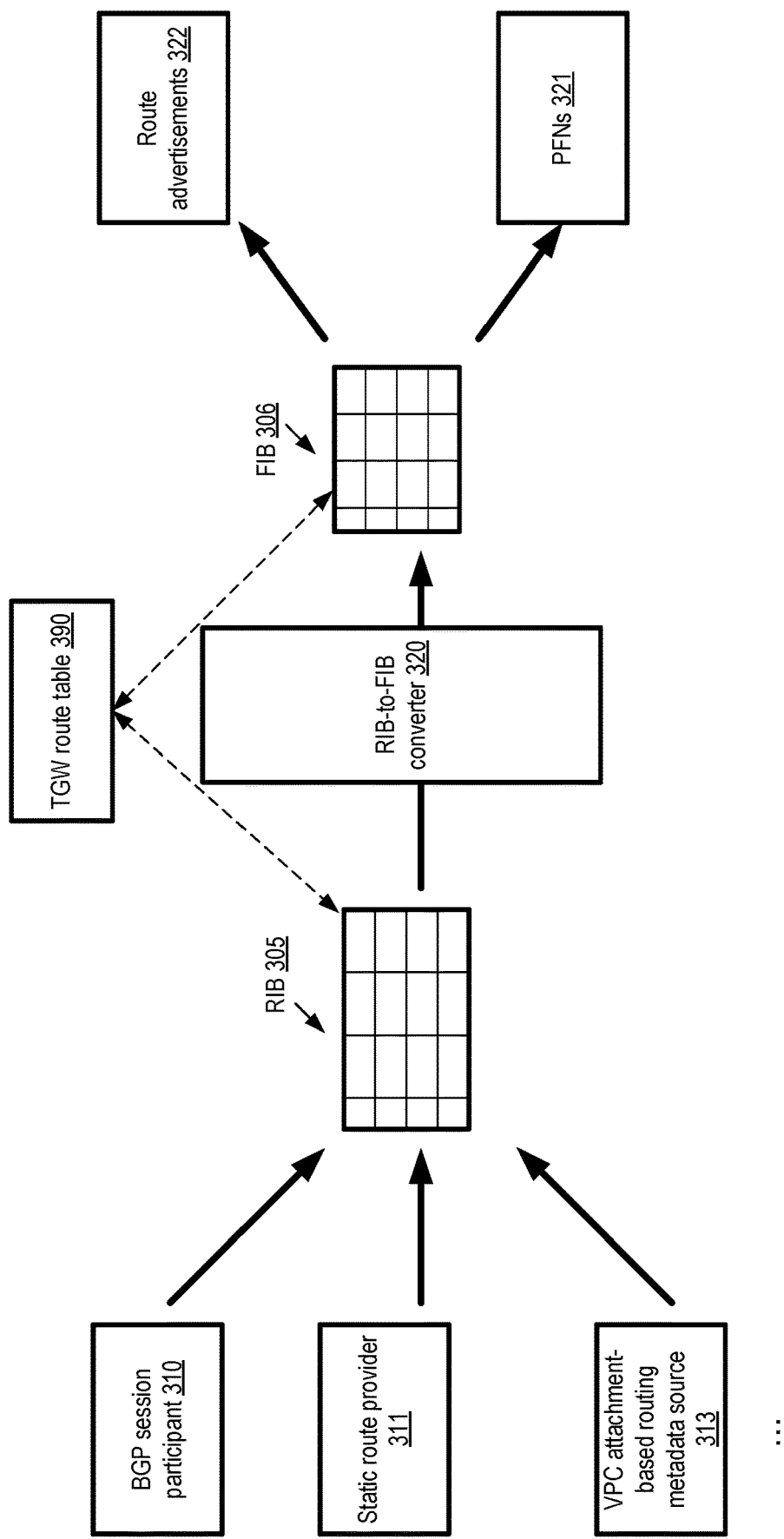
FIG. 3 illustrates an example high-level workflow for generating RIBs and FIBs of a TGW, according to at least some embodiments.

FIG. 3 illustrates an example high-level workflow for generating RIBs and FIBs of a TGW, according to at least some embodiments. To simplify the presentation, MMRs are not shown in FIG. 3; that is, it is assumed that no MMRs applicable to the TGW route table 390 have yet been received at the CS. Routing metadata pertaining to TGW route table 390 may be received from several sources at the RPNs of the TGW in the depicted embodiment, including a BGP session participant 310, a static route provider 311, and a VPC attachment-based routing metadata source 313. A BGP session participant may for example comprise a router or other networking device within one of the on-premise isolated networks attached to the TGW in some cases. A static route provider may be administrator of one of the INs attached to the TGW, or the administrator of the TGW itself. A control plane component of a VCS at which a VPC or IVN is set up may automatically provide address ranges (e.g., using Classless Inter Domain Routing or CIDR blocks) of subnets configured within the VPC to the RPNs of the TGW when the VPC is programmatically attached to the TGW in some embodiments, and thus may serve as a VPC attachment-based routing metadata source. Note that while three categories of routing information sources are shown in FIG. 3, other types of routing metadata sources may send metadata to a TGW in some embodiments.

In some embodiments, respective metadata sources may use different routing information exchange protocols to supply their routing metadata to the TGW—e.g., some sources may use BGP, others may use IGRP (Interior Gateway Routing Protocol), and yet others may use EIGRP (Enhanced IGRP). The RIB 305 may be populated dynamically from the metadata received from the various sources in some embodiments; e.g., a RIB 305 may be updated with the information contained in a message from a metadata source as soon as the message is received. In at least some embodiments, RIBs and FIBs may be implemented as in-memory data structures maintained and dynamically updated at one or more RPNs.

A RIB-to-FIB converter 320 (e.g., comprising one or more programs running at an RPN) may examine the contents of a RIB 305, and generate entries of a FIB 306 from the contents in the depicted embodiment. The RIB-to-FIB converter may for example implement logic used to eliminate potential conflicts within the RIB (e.g., cases in which different next-hops are indicated for the same destination address or destination address range) in some embodiments. Different routing information exchange protocols such as BGP and IGRP may specify their respective rules to be used to select the "best" next hops when multiple next hops are indicated in the RIB (e.g., for routes advertised using BGP, the administrative distance attribute and/or AS-paths may be used), and the RIB-to-FIB converter may implement such rules in the depicted embodiment. In at least one embodiment, the CS may define custom RIB-to-FIB conversion rules (e.g., based on internal networking metrics available at the CS), and such rules may also or instead be implemented by the RIB-to-FIB converter. In some embodiments, the FIB may be updated each time new routing metadata is received and the RIB is updated accordingly—e.g., just as the RIB may be implemented as a potentially rapidly changing data structure maintained in RPN memory, the corresponding FIB may also be implemented as a potentially rapidly changing data structure maintained in RPN memory. At least some of the RIB-to-FIB conversion algorithms implemented at the RIB-to-FIB converter may also be referred to as best path selection algorithms.

Contents of a FIB 306 corresponding to a RIB 305 and TGW route table 390 may be used for at least two kinds of tasks in the depicted embodiment. Some of the entries of the FIB may be transmitted to routing information recipient devices external to the TGW, e.g., in the form of route advertisements 322. At least some of a FIB's contents may be sent to PFNs 321 of the TGW, and used to forward packets received at the TGW from an attached IN to a next hop destination.

Figure 4:
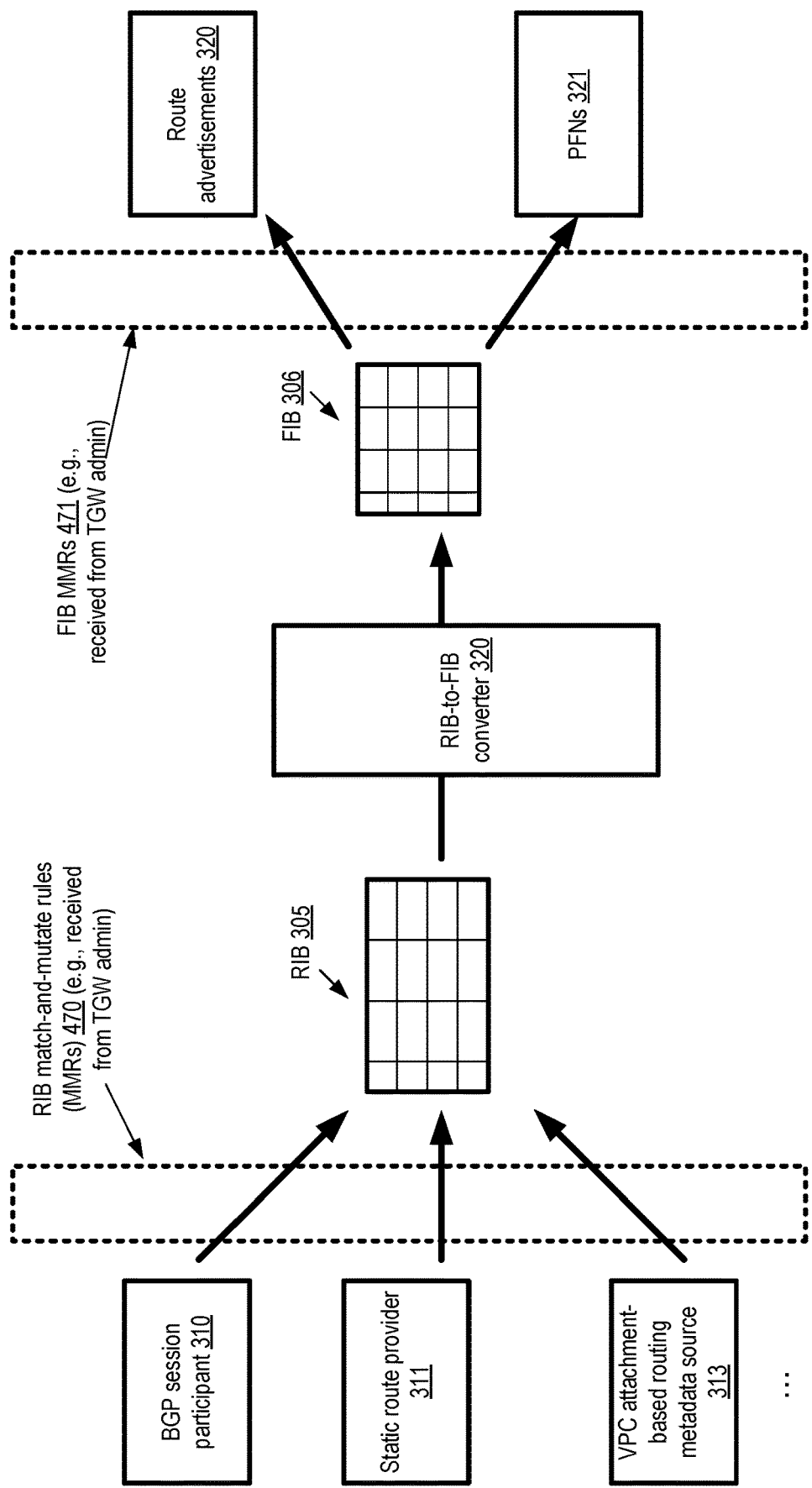
FIG. 4 illustrates an example of the generation of rule-based versions, using match-and-mutate rules received from customers of a connectivity service, of RIBs and FIBs utilized at a TGW, according to at least some embodiments.

FIG. 4 illustrates an example of the generation of rule-based versions, using match-and-mutate rules received from customers of a connectivity service, of RIBs and FIBs utilized at a TGW, according to at least some embodiments. In the depicted embodiment, an RPN of a CS at which a TGW with a particular route table (not shown in FIG. 4) is implemented may receive routing metadata from similar kinds of sources as those shown in FIG. 3: one or more BGP session participants 310, static route providers 311, and VPC attachment-based routing metadata sources 313. In addition, the RPNs may obtain one or more RIB match-and-mutate rules (MMRs) 470 and one or more FIB MMRs 471, e.g., from an administrator, owner, or other authorized user of the TGW.

Conceptually, the RPN may in effect create a modified version of the RIB 305 by applying a RIB MMR to the input (the routing metadata) which is used to populate the RIB. Similarly, the RPN may in effect create a modified version of the FIB 306 by applying the FIB MMR to the input (entries of the modified version of RIB 305), which is then used by PFNs 321 to forward packets received at the TGW. The modified version of the FIB may also be used for route advertisements 322 in the depicted. Each MMR may indicate matching criteria to be used to select a subset of the input being used to create the corresponding information base (RIB or FIB), and a mutation which is to be applied to the selected subset of the input, with results of the mutation being included in the modified version of the information base in the depicted embodiment. In some embodiments, an RPN may comprise one or more RIB generator programs which produce the modified version of the RIB using the applicable RIB MMRs. In at least some embodiments, the RIB-to-FIB converter 320 may operate on the modified version of the RIB (using similar logic to that discussed above in the context of FIG. 3) to generate a baseline version of the FIB, and then the baseline version of the FIB may be mutated to generate one or more modified versions of the FIB. In some embodiments, the FIB MMRs may be provided as input to the RIB-to-FIB converter, so that a version of a FIB 306 that incorporates the mutations indicated in the FIB MMR(s) is generated by the RIB-to-FIB converter itself. In other embodiments, a FIB mutator (e.g., comprising one or more programs running at an RPN) may apply the FIB MMRs to a baseline version of the FIB has been produced by the RIB-to-FIB converter 320.

Note that in at least some embodiments, the MMR mutations may be applied in-line, without creating and maintaining separate physical versions of RIBs and FIBs. For example, as and when new routing metadata is received at an RPN, the applicable RIB MMRs (if any) may be applied immediately, and the results may be included in the data structure used for the RIB. Similarly, in such embodiments, as soon as a new entry indicating a route is added to the RIB, the RIB-to-FIB conversion logic and any applicable FIB MMRs may be applied to it, with the results being included in a data structure used for the FIB.

Figure 5:
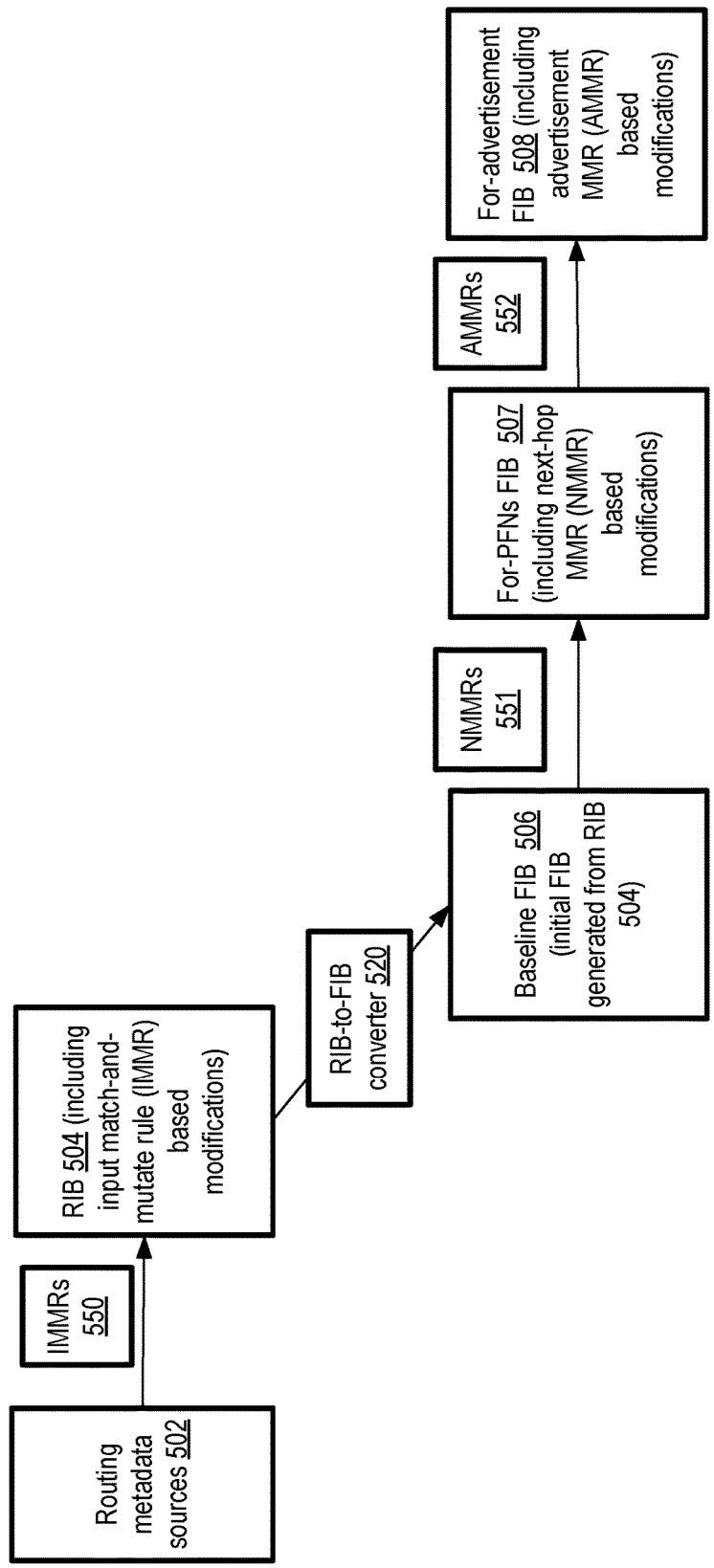
FIG. 5 illustrates an example scenario in which several kinds of matching based transformation rules for RIBs and FIBs, used in respective stages of a RIB and FIB generation pipeline, may be defined by customers of a connectivity service, according to at least some embodiments.

FIG. 5 illustrates an example scenario in which several kinds of matching based transformation rules for RIBs and FIBs, used in respective stages of a RIB and FIB generation pipeline, may be defined by customers of a connectivity service, according to at least some embodiments. Three types of MMRs may be defined by CS customers for their TGWs in the depicted embodiment: input MMRs (IMMRs), next-hop MMRs (NMMRs) and advertisement MMRs (AMMRs). The RIB and FIB generation pipeline may comprise several logical stages: a first stage in which a RIB is generated or populated based on information obtained from routing metadata sources, a second stage in which a baseline FIB is generated from the RIB, a third stage in which modifications related to next hops are included in a first mutated version of the FIB, and a fourth stage in which a second mutated version of the FIB us created from the first mutated version.

One or more IMMRs 550 may be applied to input obtained at an RPN from routing metadata sources 502 to produce a RIB 504. RIB 504 may thus include the results of IMMR based modifications applied to the raw input of the pipeline. A RIB-to-FIB converter 520 may then generate a baseline FIB 506 from the RIB 504, e.g., using standard RIB-to-FIB translation logic based on the protocols being used for the routing metadata to select routes with the best-available next hops for a given destination prefix in RIB 504.

If the CS client provides one or more NMMRs 551 for modifying next hops, a for-PFNs FIB 507 may be created from the baseline FIB. In version 507 of the FIB, one or more changes may be made to the next hop destinations indicated in the baseline FIB—e.g., if the TGW administrator wishes to force all packets directed to a particular set of destination addresses to pass through an intermediary firewall device, the next hops for routes with those destination addresses may be modified accordingly using an NMMR. From the for-PFNs FIB 507 (which may be provided to one or more PFNs, and used by the PFNs to forward packets received at the TGW), a for-advertisement FIB 508 may be generated in the next stage of the pipeline in the depicted embodiment, by applying one or more AMMRs 552 supplied/defined by the CS customer. The AMMRs may enable the customer to modify or filter routes on a per-peer basis to influence outbound route advertisements in the depicted embodiment. Note that as discussed in the context of FIG. 4, the versions of the FIB shown in FIG. 5 may represent logically distinct versions in at least some embodiments, with only a single actual FIB (in which the results of applying both NMMRs and AMMRs are represented) being stored at RPNs of the CS.

Figure 6:
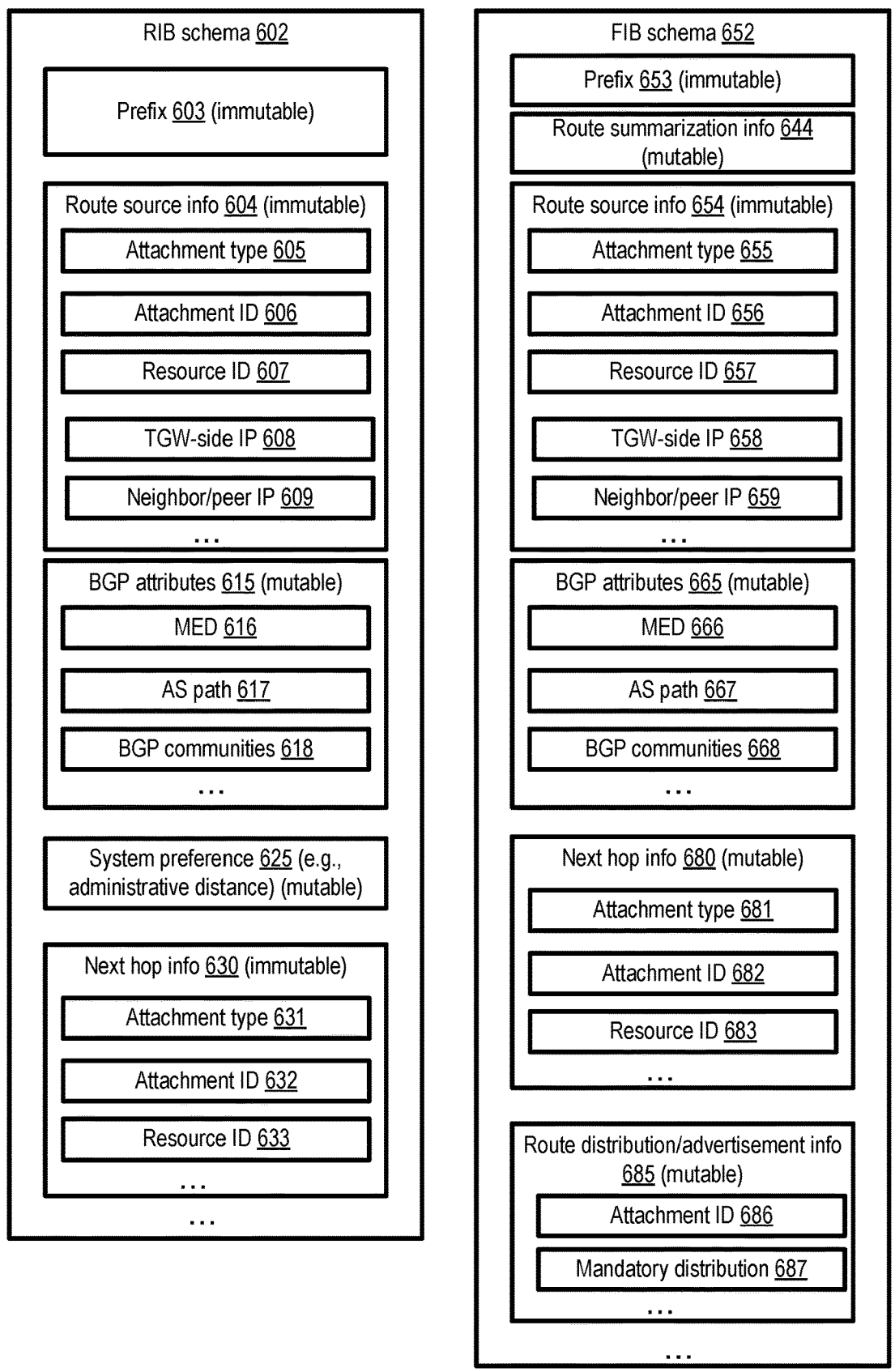
FIG. 6 illustrates example schemas of RIBs and FIBs which may be provided via programmatic interfaces to customers of connectivity services at which matching rule based mutations of RIBs and FIBs may be defined, according to at least some embodiments.

FIG. 6 illustrates example schemas of RIBs and FIBs which may be provided via programmatic interfaces to customers of connectivity services at which matching rule based mutations of RIBs and FIBs are supported, according to at least some embodiments. As mentioned earlier, in various embodiments, a tabular view of RIBs and FIBs associated with a TGW may be provided to CS customers. That is, to the customers, a given RIB may be represented as a collection of rows or entries of a table, with individual ones of the rows comprising values for some number of named columns; similarly, a FIB may be represented as a collection of rows or entries, with individual ones of the rows comprising values for some number of named columns. At least some of the columns of the RIB schema may also represent fields, columns or properties of the routing metadata which is received from various sources at the RPNs of the CS. The names of the columns used for the RIB may be provided to the customers as a RIB schema 602 in response to programmatic requests, and the names of the columns used for the FIB may be provided to the customers as a FIB schema 652 in the depicted embodiment. Many of the column names may appear in both the RIB schema and the FIB schema in the depicted embodiment. Having obtained the RIB and FIB schemas, in various embodiments the CS customer may be able to define MMRs, with a matching criterion of an individual rule of the MMR comprising a set of selection predicates on the values in various columns.

In addition to indicating the names of the columns or fields, a RIB schema or a FIB schema may also indicate which of the columns are mutable (that is, the values in which of the columns can be changed via a mutation indicated in an MMR definition), and which of the columns are immutable. The matching criteria of an MMR may be expressed using either immutable columns, mutable columns, or a combination of mutable and immutable columns in some embodiments; the mutation of an MMR may only change a value of one or more mutable columns in such embodiments. Not all the columns may be populated for all the rows/entries of a RIB or a FIB; e.g., some columns may have null values or may remain blank.

RIB schema 602 may include a route prefix 603, which is designated as immutable in the depicted embodiment. Route source information 604, which may comprise several fields about the source of routing metadata represented in the RIB, may also be designated as immutable. The fields of the route source information may for example include an attachment type 605 (indicating one of several possible categories of programmatic attachment to the TGW of the isolated network whose route information is being provided by the route source, or a category of programmatic attachment of the route source itself), a corresponding attachment ID 606 (generated at the CS when the attachment request is received), a resource ID 607 (indicating a unique identifier assigned to the route source by the cloud provider network), a TGW-side IP address 608 used to receive the routing metadata from the source (e.g., via a BGP session), a neighbor/peer IP address 609 of the source, and so on. Examples of the attachment types may include VPC/IVN attachments, direct connect gateway attachments (in which an isolated network at a premise external to the data centers of the provider network may be reached from the TGW using a dedicated physical network link with an associated direct connect gateway), VPN attachments, peered TGW attachments (in which a given TGW may be attached to another TGW to enable traffic to flow between different regions of the cloud provider network), attachments to third-party appliances (such as SD-WAN or software-defined wide area network appliances), among others.

For some RIB entries generated using routing information received via a variant or version of BGP, a set of BGP attributes 615 may be included in the RIB schema 602 in various embodiments. The BGP attributes may be designated as mutable in the depicted embodiment. BGP attributes may include, among others a MED (multi-exit discriminator) 616, an AS (autonomous system) path 617, and one or more BGP communities 618 in some embodiments. In some embodiments, a set of route properties referred to as system preferences 625 may be included among the mutable fields of a RIB entry. System preferences may for example include "administrative distance", which may represent a measure of trustworthiness of the source of the routing information.

The RIB schema may include next hop information 630, which may be designated as immutable in the depicted embodiment (note that in contrast, the corresponding next hop information 680 in the FIB schema may be designated as mutable.) The next hop information may include attachment type field 631, attachment ID 632 and a resource ID 633, all indicative of the next hop destination for the route prefix 603.

FIB schema 652 may also include a prefix 653 in the depicted embodiment, designated as immutable like the corresponding field in the RIB schema. Route summarization information 644 of the FIB schema, designated as mutable, may indicate whether a summarization technique for reducing the number of prefixes advertised to peers by the TGW is being used or not with respect to the prefix 653. Route source information fields 654 of the FIB schema, designated as immutable, may include similar fields to those of route source information 604 of the RIB schema, such as attachment type 655, attachment ID 656, resource ID 657, TGW-side IP 658, and neighbor/peer IP 659. Mutable BGP attributes 665 of the FIB schema may include MED 666, AS path 667, and BGP communities 668. The next hop information 680 of the FIB schema may be designated as mutable, and may be modified using FIB MMRs to influence the path taken by packets received at the TGW in accordance with policies selected by the CS customer, such as policies that pass some selected packet flows through a security appliance or firewall. Next hop information 680 may include the attachment type 681, attachment ID 682, and/or resource ID 683 of the next hop destination in various embodiments. In at least some embodiments, the FIB schema may include one or more mutable route distribution/advertisement information 685 fields such as an attachment ID 686 of a destination or peer to which the FIB entry should be advertised, a mandatory distribution field 687 which indicates whether the FIB entry has to be advertised (or advertisement is optional), and so on. In some implementations RIB schemas and/or FIB schemas may comprise different combinations of fields or columns than those shown in FIG. 6.

Figure 7:
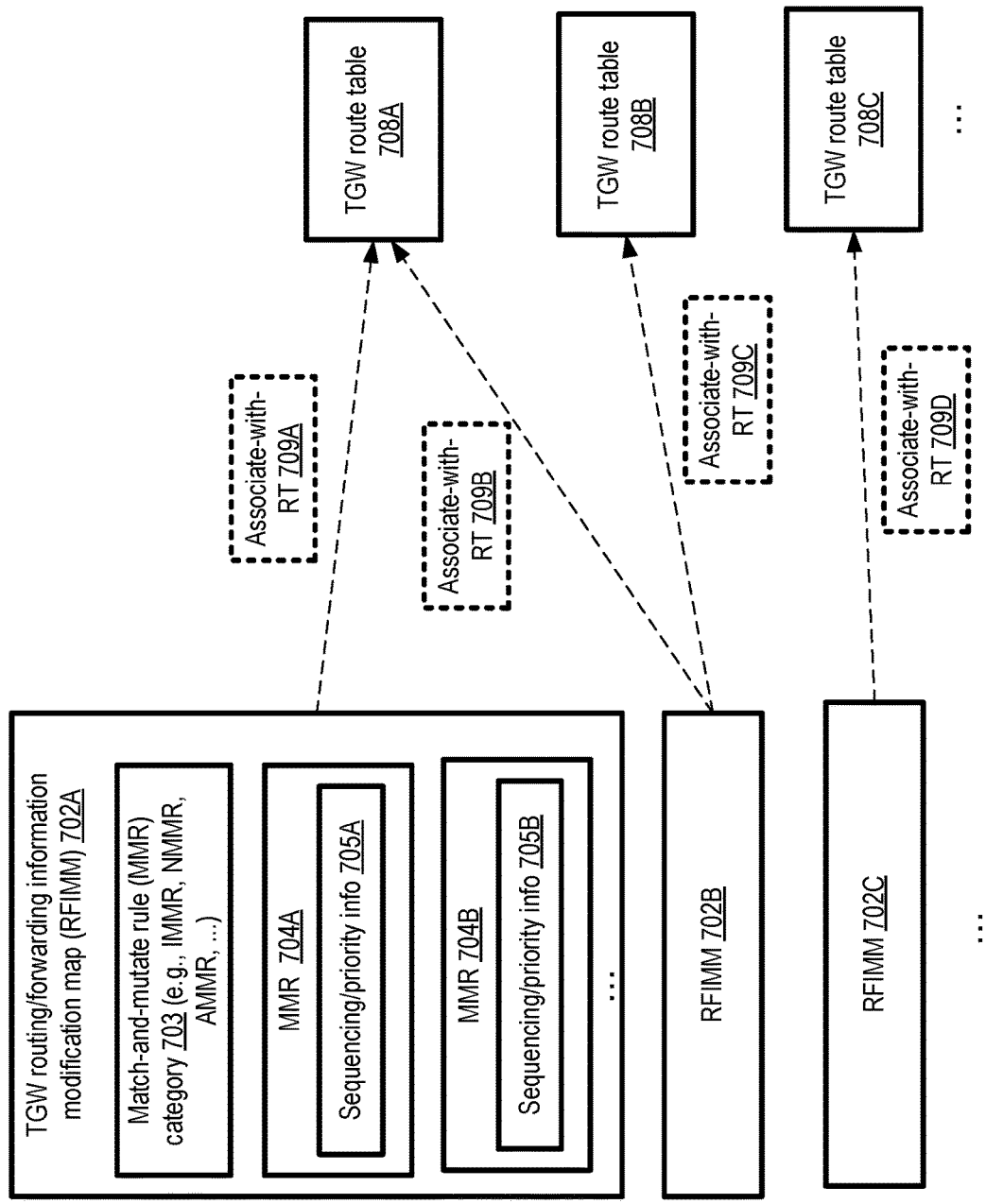
FIG. 7 illustrates an example scenario in which customers may associate TGW routing/forwarding information modification maps, each comprising one or more match-and-modification rules with respective relative priorities, with various route tables of a TGW, according to at least some embodiments.

FIG. 7 illustrates an example scenario in which customers may associate TGW routing/forwarding information modification maps, each comprising one or more match-and-modification rules with respective relative priorities, with various route tables of a TGW, according to at least some embodiments. Routing/forwarding information modification maps (RFIMMs) may provide a mechanism for grouping related MMRs together for a TGW, and for indicating the order in which the related MMRs should be applied to routing metadata received at the CS and/or RIB/FIB entries generated from the routing data.

In the depicted embodiment, an RFIMM such as RFIMM 702A may be created for a TGW at the CS in response to a programmatic request from a customer. A given RFIMM may comprise one or more MMRs of a particular category from among the categories discussed in the context of FIG. 5—input MMRs (IMMRs), next-hop MMRs (NMMRs), and advertisement MMR (AMMRs). Other categories of MMRs may be supported at the CS in some embodiments. The MMR category 703 may be stored in a data structure representing the RFIMM 702A.

An RFIMM may be associated with a TGW route table in response to a customer request in various embodiments. For example, based on associate-with-RT request 709A, RFIMM 702A may be associated with TGW route table 708A. Based on associate-with-RT request 709B, RFIMM 702B may be associated with TGW route table 708A. Similarly, based on associate-with-RT request 709C, RFIMM 702B may be associated with TGW route table 708B, and based on associate-with-RT request 709D, FIMM 702C may be associated with TGW route table 708C. A given RFIMM may be associated with multiple TGW route tables in some embodiments. In some embodiments, a given TGW route table may be associated with at most one RFIMM containing MMRs of a particular category; in other embodiments, multiple RFIMMs of the same category may be associated with a route table, and relative priorities or sequencing information about such RFIMMs may be provided programmatically by the customer.

The customer may submit additional programmatic requests to add MMRs of the category indicated in the RFIMM to the RFIMM, such as MMR 704A, MMR 704B, etc. For each MMR included in the RFIMM, the customer may specify sequencing/priority information, such as sequencing/priority information 705A of MMR 704A, sequencing/priority information 705B of MMR, and so on. In one implementation, the sequencing/priority information may each comprise an integer value, and the RPN may apply the different MMRs of the RFIMM to routing information of the relevant route tables in increasing order of those integers.

As the MMRs of the RFIMM are applied, if the matching criterion of a given MMR is satisfied, the mutation indicated in that MMR may be applied. The final mutation may in some embodiments comprise an action: to accept or drop the routing information being considered from a RIB or a FIB.

Internally at the CS, RFIMMs may be represented or stored using syntax similar to the following in some embodiments. Example TGW-RFIMM-1 comprises MMRs of the input category (IMMR), and currently comprises just one MMR for which the sequence (the integer used to determine the order in which different MMRs of the RFIMM may be executed, if the RFIMM has multiple MMRs) is set to 100. The matching criteria indicates that the mutation DROP (i.e., dropping of the route from the RIB) is to be applied to routes whose AS path is 65001 or 65000.

```
TGW-RFIMM-1
{ "type": IMMR,
   "MMRs": [
      {
         "sequence": 100,
         "matching-criteria": {
            "type": "as-path-equals",
            "value": [65001, 65000]
         },
         "mutation": [DROP]
      }
   ]
}
```

Example TGW-RFIMM-2 comprises MMRs of the advertisement category (AMMR), and currently also comprises just one MMR for which the sequence (the integer used to determine the order in which different MMRs of the RFIMM may be executed, if the RFIMM has multiple MMRs) is set to 200. The matching criteria indicates that the mutation prepend-as-path (prepending the value 65001 to an AS path attribute) is to be applied to routes whose TGW attachment type is "peering".

```
TGW-RFIMM-2
{ "type": AMMR,
   "MMRs": [
      {
         "sequence": 200,
         "matching-criteria": {
            "type": "tgw-attachment-type",
            "value": "peering"
         },
         "mutation": [ {
            "type": "prepend-as-path",
            "value": "65001"
         }]
      }
   ]
}
```

Note that RFIMMs represent one of many possible ways of organizing MMRs for TGWs. In some embodiments, RFIMMs may not be used, and MMRs may be associated directly with routing tables of TGWs, for example.

Figure 8:
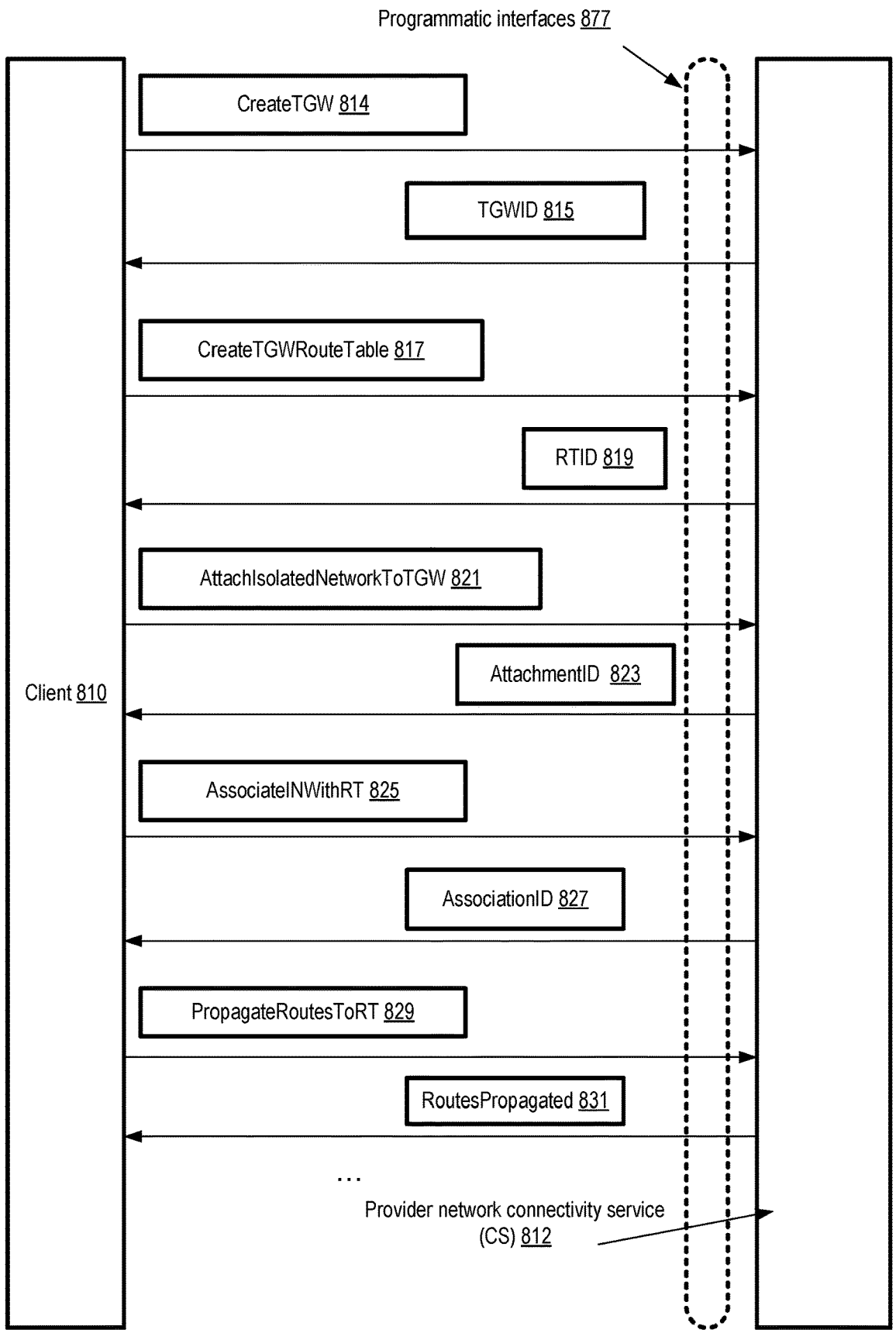
FIG. 8 and FIG. 9 collectively illustrate example programmatic interactions between customers and a connectivity service of a cloud provider network, according to at least some embodiments.
Figure 9:
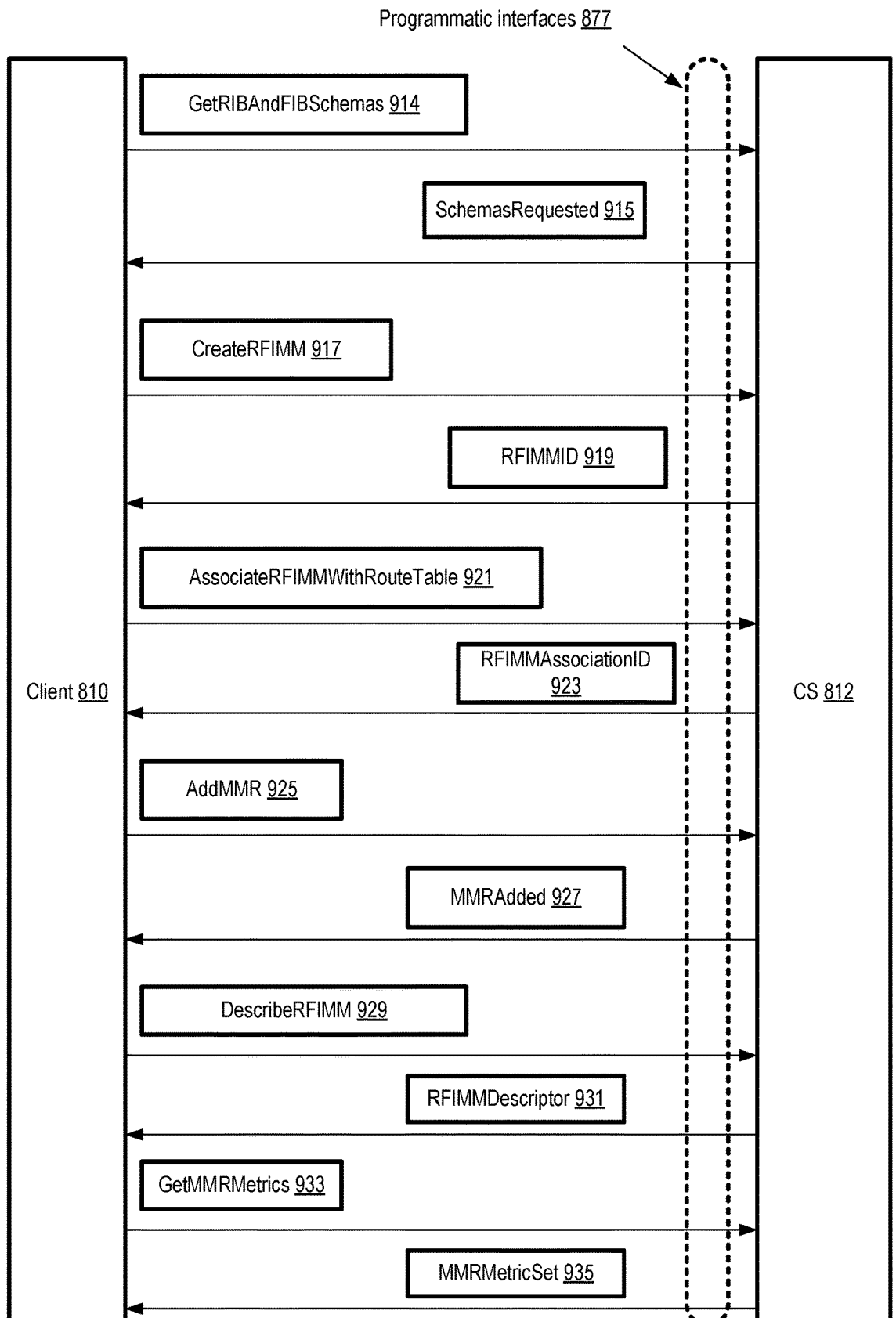

FIG. 8 and FIG. 9 collectively illustrate example programmatic interactions between customers and a connectivity service of a cloud provider network, according to at least some embodiments. One or more programmatic interfaces 877 may be implemented by the provider network's CS 812 at which TGWs can be configured on behalf of various customer or clients in the depicted embodiment. Such interfaces may include, for example, a set of APIs, graphical user interfaces, command line tools, web-based consoles and the like in different embodiments.

A client 810 of the CS 812 may submit a CreateTGW request 814 to initiate the process of configuring a TGW in the depicted embodiment. In response to the CreateTGW request, the CS may provide a TGWID (TGW identifier) 815 in some embodiments, indicating that the requested TGW has been created (e.g., that metadata representing the TGW has been stored in a repository maintained at the CS).

To create a routing table of the VTH, a CreateTGWRouteTable request 817 may be submitted via the interfaces 877 in some embodiments. An RTID response 819 may be transmitted by the CS 812 to the client in some embodiments. The client may submit a programmatic request (AttachIsolatedNetworkToTGW) 821 to attach a specified isolated network (e.g., an IVN within the provider network at which the CS 812 is implemented, a VPN-connected network outside the provider network's data centers, or an external network connected to the provider network via a dedicated physical link) to a specified TGW in some embodiments, and receive an attachment identifier (AttachmentID) 823 in response. Note that such a programmatic attachment may serve as a pre-requisite for subsequent association of the isolated network with a particular route table in at least some embodiments; in such embodiments, packets may not actually be routed from/to the isolated network by the VTH until the association operation is performed, even if the isolated network has been programmatically attached to the VTH. In other embodiments, the CS may automatically associate a selected route table of the VTH (if an appropriate route table has been created) with the isolated network in response to an attachment request.

An association request (AssociateINWithRT) 825 may be submitted by a client 810 to indicate the particular route table of the TGW which is to be used to route at least a portion of traffic originating at a particular isolated network in the depicted embodiment. In some embodiments, as mentioned earlier, an association request 825 may include an optional policy parameter or rule indicating one or more packet properties to be used to identify a subset of outbound packets of the particular isolated network that are to be routed using the specified table. Metadata indicating the association between the specified route table of the TGW and the isolated network may be stored at the CS, and an association identifier (AssociationID) 827 may be provided to the client in some embodiments. In at least some embodiments, after a route table has been programmatically associated with an isolated network, PFNs assigned by the CS to the TGW may begin routing traffic originating at the isolated network using a FIB generated from the associated route table. Note that the associated route table may need to be populated with relevant entries (e.g., as a result of PropagateRoutesToRT requests of the kind discussed below) for packets to be routed correctly; if a packet is received at the TGW PFN at a point in time at which there are no applicable route table entries in the associated route table for the packet, and hence no FIB entries relevant to the packet, the packet may be dropped in at least some embodiments.

In some embodiments, a programmatic request (PropagateRoutesToRT) 829 to propagate a specified set of one or more route table entries (e.g., entries whose destinations are within a particular isolated network attached to the TGW) to a specified route table of the TGW may be submitted by a client. The routes may be added to the indicated table and a RoutesPropagated message 831 may be sent to the client to indicate that the routes have been propagated. In at least one embodiment, in addition to or instead of using APIs (such as PropagateRoutesToRT) of the CS, routing information exchange protocols similar to BGP (the Border Gateway Protocol) may be used to populate entries in the routing tables of TGWs. For example, in some embodiments, reachability/routing information pertaining to devices within a VPN-connected isolated network external to the provider network may be transmitted to the provider network using BGP or a similar protocol, and corresponding entries may be propagated into the route tables (and corresponding RIBs/FIBs) of one or more TGWs to which the isolated network is attached. Routing information pertaining to devices within the provider network may be transmitted/advertised to the external network as well using such protocols. In one implementation, routing information exchange protocol sessions (e.g., BGP sessions) may be established between an external network and a protocol processing device (e.g., a BGP endpoint or peer at an RPN of the CS) within the provider network. Information received during at least a portion of such a session may be used to generate/obtain a route table entry (and corresponding RIB/FIB entries), and the protocol processing device may use the CS's programmatic interfaces (similar to PropagateRoutesToRT) to request that the route table entry be included in one or more TGW route tables. In at least one embodiment, such protocols may be used for obtaining route table entries for all the different types of isolated networks that may be attached to a TGW: e.g., route table entries may be obtained for a TGW, using one or more messages of a BGP-like protocol, representing destinations within isolated virtual networks (IVNs)/VPCs, within VPN-connected external networks, and/or within external networks connected to the provider network using direct physical links of the kind discussed above. From the perspective of a client of the packet processing service, a TGW may appear to include a routing information exchange protocol processing engine (e.g., similar to a BGP endpoint or peer) in at least some embodiments, so that the protocol may be used to propagate routing metadata to/from the VTH.

As shown in FIG. 9, several types of additional programmatic interactions pertaining to MMRs of the kind introduced above may be supported by a CS 812 in various embodiments. For example, a customer or client 810 may submit a GetRIBAndFIBSchemas request 914 via programmatic interfaces 877 to obtain the schemas of RIBs and/or FIBs generated at the CS for one or more of the client's TGWs. The schemas may be presented to the client via one or more SchemasRequested messages 915 in the depicted embodiment. The schemas may indicate the attributes, fields or columns of the RIBs and FIBs, and may also indicate the types or categories of permitted MMR-based mutations to the RIBs/FIBs (e.g., by indicating which fields/attributes can be mutated and which fields are immutable). In at least one embodiment, in addition to schemas themselves, a list of permitted mutation categories (such as set-AS-path to indicate a change to an AS path attribute) may be provided to clients via the programmatic interfaces.

In some embodiments in which TGW routing/forwarding information modification maps (RFIMMs) of the kind shown in FIG. 7 are supported, a client may request the establishment of a new RFIMM by submitting a CreateRFIMM request 917. The new RFIMM may be created, and an identifier selected for it by the CS may be sent to the client in an RFIMMID message 919 in the depicted embodiment. An AssociateRFIMMWithRouteTable request 921 may be submitted by the client to associate a specified RFIMM with a specified TGW route table in some embodiments. Metadata indicating the association of the RFIMM with the route table may be stored at a repository of the CS, and an RFIMMAssociationID message 923 indicating that the association has been done may be sent to the client in some embodiments. The association of the RFIMM with the route table may indicate that the MMRs included in the RFIMM are to be applied to routing metadata or entries of the route table. In at least one embodiment, a default RFIMM may be created on behalf of a customer without receiving a request to create the RFIMM.

A client may request the addition of a specified MMR to an RFIMM by submitting an AddMMR request 925 in some embodiments. The MMR may be included in the RFIMM, and an MMRAdded message 927 may be sent to the client. In some embodiments, clients may use an AddMMR request to add an MMR to the set of MMRs to be used for a specified route table, or for all the route tables of the TGW, without creating an RFIMM first; that is, RFIMMs may not be required in such embodiments.

A DescribeRFIMM request 929 may be sent by a client to view the contents or properties (e.g., including the MMR category of the RFIMM, the current list of MMRs of the RFIMM and the MMRs' sequencing information) of a specified RFIMM. A descriptor of the RFIMM indicating its properties/contents may be sent to the client via one or more RFIMMDescriptor messages 931 in the depicted embodiment. In some embodiments, DescribeMMR requests may be sent by clients to view properties of specified MMRs.

In at least one embodiment, the control plane of the CS may collect and maintain various metrics pertaining to the use of MMRs, such as the number of received routes from various routing metadata sources to which mutations of the MMR were applied using various MMRs over some time period, the number of changes to next hop information, the number of mutations of the different permitted categories of mutations, and the like. A client may request such metrics for one or more MMRs by submitting a GetMMRMetrics request 933 in the depicted embodiment. The metrics requested may be supplied to the client via one or more MMRMetricSet messages 935.

Note that a different combination of programmatic interactions may be supported in some embodiments for configuring and using TGWs and MMRs than those shown in FIG. 8 and FIG. 9. For example, in one embodiment, several of the operations discussed may be performed in response to a single request instead of using separate requests, additional types of requests pertaining to deleting MMRs or RFIMMs may be supported, and so on.

Figure 10:
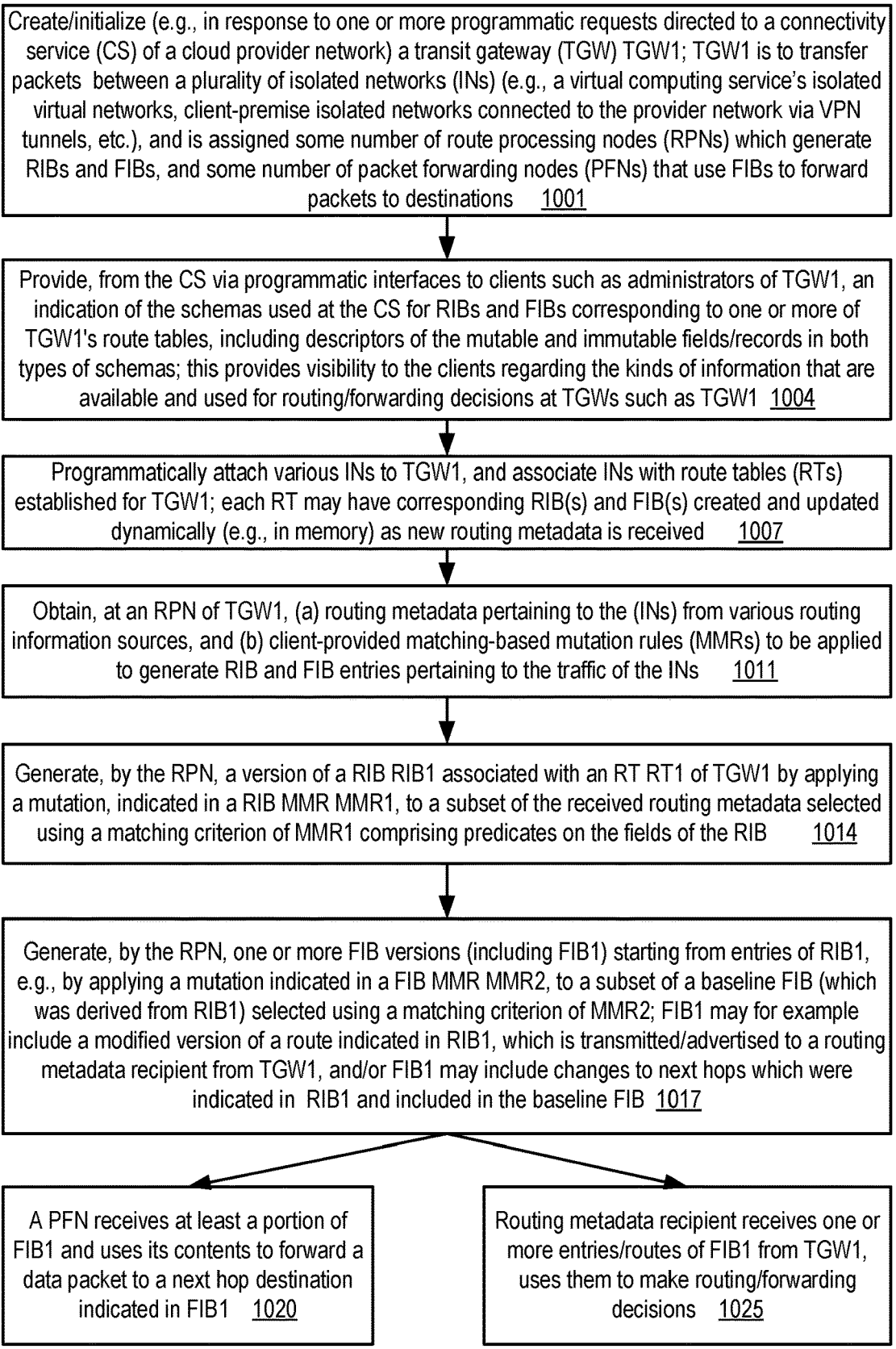
FIG. 10 is a flow diagram illustrating aspects of operations which may be performed to support matching rule based mutations of RIBs and FIBs used for TGWs of a connectivity service, according to at least some embodiments.

FIG. 10 is a flow diagram illustrating aspects of operations which may be performed to support matching rule based mutations of RIBs and FIBs used for TGWs of a connectivity service, according to at least some embodiments. As shown in element 1001, a transit gateway (TGW) TGW1 may be created or initialized, e.g., in response to one or more programmatic requests directed to a connectivity service (CS) of a cloud provider network by a customer or client, such as an administrator or owner of the TGW. TGW1 may be set up to transfer packets between a plurality of isolated networks (INs) (e.g., a VCS's isolated virtual networks, client-premise isolated networks connected to the provider network via VPN tunnels or direct dedicated network links, etc.). TGW1 may be assigned some number of route processing nodes (RPNs) which generate RIBs and FIBs from routing metadata received for the TGW at the CS, and some number of packet forwarding nodes (PFNs) that use FIBs to forward packets to destinations in the depicted embodiment.

The client may be provided, from the CS via programmatic interfaces, an indication of the schemas used at the CS for RIBs and FIBs corresponding to one or more of TGW1's route tables (element 1004) in at least some embodiments. The schemas may include descriptors of the mutable and immutable fields/records in both types of schemas; this may provide visibility to the client regarding the kinds of information that are available and used for routing/forwarding decisions at TGWs such as TGW1, and the categories of mutations that can be made to the RIBs and/or FIBs using client-supplied rules.

Various INs may be programmatically attached to TGW1 and associated with one or more route tables (RTs) established for TGW1 in the depicted embodiment (element 1007). Each RT may have corresponding RIB(s) and FIB(s) created and updated dynamically (e.g., within memory of RPNs of the CS) as new routing metadata is received.

As shown in element 1011, routing metadata (e.g., routes formatted according to any of various protocols) may be received at an RPN assigned to TGW1 from several routing information sources. In addition, one or more MMRs to be applied by the RPN to generate RIB and FIB entries from the routing metadata pertaining to the traffic of different INs may be obtained via programmatic interfaces from the client.

The RPN may generate a version of a RIB, RIB1, associated with a route table RT1 by applying a mutation, indicated in a RIB MMR MMR1, to a subset of received routing metadata (element 1014). The subset may be selected using a matching criterion of MMR1, comprising predicates on one or more of the fields of the RIB schema in various embodiments.

From RIB1, the RPN may generate one or more FIB versions (including a version FIB1) in the depicted embodiment (element 1017). In some embodiments, the process of generating FIB1 from the RIB may involve first generating a baseline FIB by applying a standard set of RIB-to-FIB conversion algorithms, and then applying a client-supplied FIB MMR MMR2 to a subset of the baseline FIB. In other embodiments, a FIB MMR may be applied directly to the entries of the RIB. In either case, one or more entries of FIB1 may comprise modified versions of entries within RIB1 (whether the modified versions ewer first included in the baseline FIB, or not). MMR2 may include a matching criterion expressed using predicates on the fields of the FIBs, and a mutation to be applied to the entries (of the baseline FIB, or the underlying RIB) which satisfy the criterion. FIB1 may for example include a modified version of a route indicated in RIB1, which may then be transmitted from the RPN to one or more routing information recipients external to TGW1. In some cases FIB1 may include changes to one or more next hops which were indicated in RIB1 and included in FIB-baseline.

A PFN of TGW1 may receive at least a portion of FIB1 and use its contents to forward a data packet to a next hop destination indicated in FIB1 (element 1020). The next hop destination may have been modified by the RPN using one or more MMRs in some cases. A routing metadata recipient may receive one or more entries/routes of FIB1 from TGW1's RPN, and use them to make its own routing/forwarding decisions in the depicted embodiment (element 1025).

It is noted that in various embodiments, some of the operations shown in the FIG. 10 may be implemented in a different order than that shown in the figure, or may be performed in parallel rather than sequentially. Additionally, some of the operations shown in FIG. 10 may not be required in one or more implementations. For example, in one implementation, MMRs for modifying RIBs may be supported without providing support for MMRs that modify FIBs.

Figure 11:
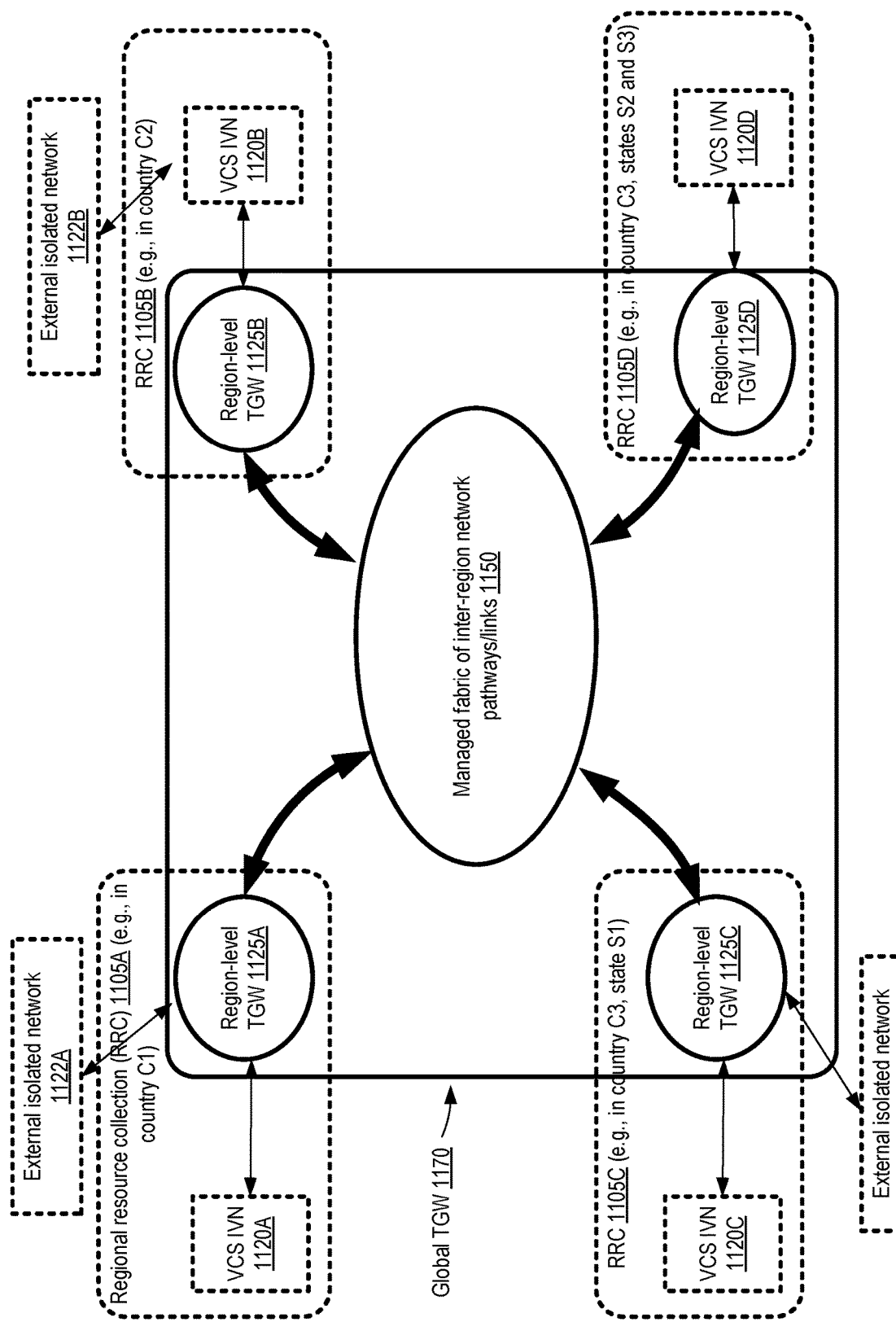
FIG. 11 illustrates an example global managed fabric linking region-level TGWs of a cloud provider network, according to at least some embodiments.

FIG. 11 illustrates an example global managed fabric linking region-level TGWs of a cloud provider network, according to at least some embodiments. In the depicted embodiment, a provider network's resources may comprise at least four regional resource collections (RRCs) 1105A-1105D. For example, RRC 1105A may comprise one or more data centers in a country C1, RRC 1105B may comprise one or more premises in country C2, RRC 1105C may include locations in state S1 of country C3, and RRC 1105D may comprise resources in states S2 and S3 of country C3. RRCs may be referred to simply as regions of the provider network in some embodiments. On behalf of a customer of the provider network, IVNs of a VCS of the provider network may have been set up at each of the RRCs—e.g., VCS IVNs 1120A-1120D may have been established in RRCs 1105A-1105D respectively. Furthermore, in the depicted example scenario, the customer may also have one or more external isolated networks, such as 1122A, 1122B or 1122C, at premises outside the provider network's data centers. Such external isolated networks may be connected to the provider network, for example, using VPNs or dedicated physical links as discussed earlier.

In order to manage the routing of network traffic in a scalable manner between resources in various of the internal and external isolated networks, a respective region-level TGW 1125, similar in features to TGW 102 of FIG. 1, may be configured within each of the RRCs 1105 in the depicted embodiment. For example, TGWs 1125A-1125D may be established in RRCs 1105A-1105D respectively. Depending, for example, on their relative proximity to an RRC, individual ones of the external isolated networks may be programmatically attached to one of the region-level TGWs in some embodiments—e.g., external isolated networks 1122A-1122C may be attached to TGWs 1125A-1125C respectively.

A dynamically scalable fabric of inter-region network pathways or links 1150, may be used to enable packets to flow at desired levels of performance and availability in various embodiments. The links of the fabric may be provisioned and managed (e.g., by adding/acquiring new fiber optic or other types of physical links, upgrading or otherwise changing the links and/or devices used) by the provider network operator, e.g., without requiring input from clients of the provider network on whose behalf the fabric is being used. Collectively, the combination of region-level TGWs 1125 and the pathways that connect them on behalf of a client may be considered a global TGW 1170 set up for the client in the depicted embodiment. For example, the client may submit a programmatic request indicating (e.g., via respective network identifiers or virtual network interface identifiers) a set of isolated networks that are to be connected to one another using TGWs, and the packet processing service may configure the required set of region-level TGWs as well as cross-region links in some embodiments. In such embodiments, the client may not even have to request the establishment of individual ones of the region-level TGWs, or request specific attachment, association or route propagation operations of the kind discussed earlier. The user experience of the client may thereby be made much smoother or easier than if the client had to issue multiple programmatic requests in such embodiments. Note that if non-default connectivity is required—e.g., if traffic to/from some of the internal or external isolated networks is to be restricted to flowing from/to specific ones of the other external isolated networks, the client may have to programmatically inform the packet processing services regarding such requirements in at least some embodiments. The client may also use programmatic interfaces of the CS to submit MMRs that can be applied to generate RIB and FIB versions as described earlier in the depicted embodiment, enabling routing policies to be applied at the global level.

Figure 12:
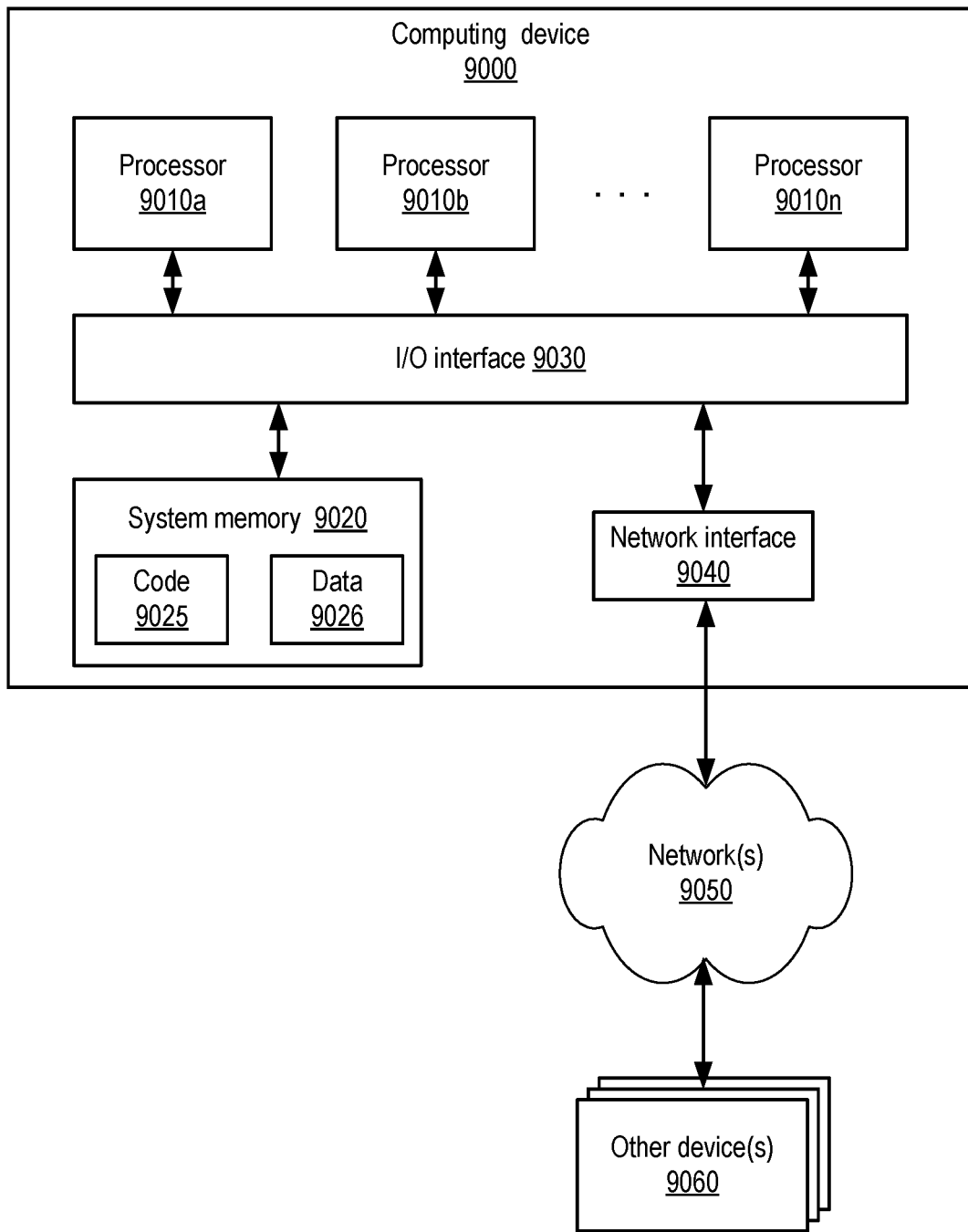
FIG. 12 is a block diagram illustrating an example computing device that may be used in at least some embodiments.

In at least some embodiments, a server that implements the types of techniques described herein (e.g., including the described functionality of connectivity service nodes, VCS servers and the like), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a route processing node of a connectivity service of a cloud provider network configured to at least:
      obtain, from a Border Gateway Protocol (BGP) route advertisement generator and a Virtual Private Cloud (VPC) route provider, routing metadata to be utilized at a transit gateway of the connectivity service for transmitting network packets between a plurality of isolated networks;
      generate, from the routing metadata, a routing information base (RIB) of the transit gateway, wherein the RIB comprises a first set of entries, wherein to generate the RIB, the route processing node applies a first rule to a subset of the routing metadata to obtain a modified version of the subset which is included in an entry of the RIB, wherein the first rule is obtained programmatically at the connectivity service from a customer on whose behalf the transit gateway is established, and wherein the first rule indicates (a) a first matching criterion which is used to select the subset of the routing metadata and (b) a first mutation to be implemented with respect to the subset; and
      generate, from a first version of a particular entry of the RIB, a second version of the particular entry for inclusion in a forwarding information base (FIB) of the transit gateway, wherein the second version is generated at least in part by applying a second rule obtained programmatically at the connectivity service from the customer, and wherein the second rule indicates (a) a second matching criterion used to select the first version and (b) a second mutation to be implemented with respect to the first version to obtain the second version; and
   a data packet forwarding node of the connectivity service, configured to at least:
      obtain, from the route processing node, at least a portion of the FIB, wherein the portion of the FIB indicates a next hop destination to which a data packet received at the transit gateway is to be forwarded; and
      forward the data packet to the next hop destination.

2. The system as recited in claim 1, wherein the first matching criterion indicates one or more of: (a) a property of a route prefix, (b) an identifier of a network of the plurality of networks, (c) an identifier of a routing information source, (d) an attachment category of a plurality of attachment categories which can be used to programmatically attach an isolated network of the plurality of isolated networks to the transit gateway, (e) a Border Gateway Protocol (BGP) attribute, or (f) a network address of a participant in a routing information exchange session.

3. The system as recited in claim 1, wherein the first mutation comprises a change to one or more of: (a) an autonomous system (AS) path, (b) an administrative distance, (c) a local preference, or (d) a community tag.

4. The system as recited in claim 1, wherein the route processing node is further configured to:
   determine the next hop destination by applying a third rule obtained programmatically at the connectivity service from the customer.

5. The system as recited in claim 1, further comprising a control plane node of the connectivity service, wherein the control plane node is configured to at least:
   cause to be presented, via a programmatic interface, an indication of respective schemas of the RIB and the FIB, wherein the respective schemas indicate one or more permitted categories of mutations to the RIB or the FIB which can be applied via respective rules, wherein the first mutation belongs to the one or more permitted categories, and wherein the second mutation belongs to the one or more permitted categories.

6. A computer-implemented method, comprising:
   obtaining, at a route processing node of a connectivity service from a plurality of routing information sources, routing metadata to be utilized at a transit gateway of the connectivity service for transmitting network packets between a plurality of networks;
   generating, by the route processing node from the routing metadata, a routing information base (RIB) of the transit gateway, wherein the generating comprises applying a first rule to a subset of the routing metadata, wherein the first rule is obtained programmatically at the connectivity service, and wherein the first rule indicates (a) a first matching criterion which is used to select the subset of the routing metadata and (b) a first mutation to be implemented with respect to the subset; and
   obtaining, at a packet forwarding node of the connectivity service from the route processing node, at least a portion of a forwarding information base (FIB) generated by the route processing node from the RIB, wherein the portion of the FIB indicates a next hop destination to which a data packet received at the transit gateway is to be forwarded; and
   transmitting, by the packet forwarding node, the data packet to the next hop destination.

7. The computer-implemented method as recited in claim 6, wherein the first matching criterion indicates one or more of: (a) a property of a route prefix, (b) an identifier of a network of the plurality of networks, (c) an identifier of a routing information source, (d) an attachment category of a plurality of attachment categories which can be used to programmatically attach a network of the plurality of networks to the transit gateway, (e) a Border Gateway Protocol (BGP) attribute, or (f) a network address of a participant in a routing information exchange session.

8. The computer-implemented method as recited in claim 6, wherein the first mutation comprises a change to one or more of: (a) an autonomous system (AS) path, (b) an administrative distance, (c) a local preference, or (d) a community tag.

9. The computer-implemented method as recited in claim 6, wherein the first mutation comprises deletion or dropping of at least a portion of the subset.

10. The computer-implemented method as recited in claim 6, wherein the first matching criterion is expressed using a combination of predicates.

11. The computer-implemented method as recited in claim 6, further comprising:
   causing to be presented, via a programmatic interface, an indication of a schema of the RIB, wherein the schema indicates one or more fields of routing metadata to which mutations are permitted via rules obtained programmatically at the connectivity service.

12. The computer-implemented method as recited in claim 6, further comprising:
   causing to be presented, via a programmatic interface, an indication of a schema used for one or more versions of the FIB generated at the connectivity service from the RIB, wherein the schema indicates one or more fields of the one or more versions of the FIB to which mutations are permitted via rules obtained programmatically at the connectivity service.

13. The computer-implemented method as recited in claim 6, further comprising:
   generating, by the route processing node, from a first version of a particular route indicated in the RIB, a second version of the particular route, wherein the second version of the particular route is generated by applying a second rule obtained programmatically at the connectivity service, wherein the second rule indicates (a) a second matching criterion for applying the second rule and (b) a second mutation to be applied to the second version; and
   causing, by the route processing node, the second version to be transmitted from the transit gateway to a routing metadata recipient external to the transit gateway.

14. The computer-implemented method as recited in claim 6, further comprising:
   establishing a route table of the transit gateway in response to a first request received at the connectivity service via one or more programmatic interfaces; and
   associating the first rule with the route table in response to a second request received at the connectivity service via the one or more programmatic interfaces, wherein at least a portion of the routing metadata is utilized to populate the route table.

15. The computer-implemented method as recited in claim 6, further comprising:
   receiving, at the connectivity service via one or more programmatic interfaces, sequencing information indicating an order in which a plurality of rules, including the first rule and a second rule, are to be applied to the routing metadata to generate the RIB, wherein the generating further comprises applying the first rule and the second rule in the order indicated in the sequencing information.

16. A non-transitory computer-accessible storage medium storing program instructions that when executed on a processor:
   obtain, at a route processing node of a connectivity service from a plurality of routing information sources, routing metadata to be utilized at a transit gateway of the connectivity service for transmitting network packets between a plurality of networks;
   generate, by the route processing node from the routing metadata, a routing information base (RIB) of the transit gateway, wherein generation of the RIB comprises applying a first rule to a subset of the routing metadata, wherein the first rule is obtained programmatically at the connectivity service, and wherein the first rule indicates (a) a first matching criterion which is used to select the subset of the routing metadata and (b) a first mutation to be implemented with respect to the subset; and
   obtain, at a packet forwarding node of the connectivity service from the route processing node, at least a portion of a forwarding information base (FIB) generated by the route processing node from the RIB, wherein the portion of the FIB indicates a next hop destination to which a data packet received at the transit gateway is to be forwarded; and
   transmit, by the packet forwarding node, the data packet to the next hop destination.

17. The non-transitory computer-accessible storage medium as recited in claim 16, storing further program instructions that when executed on the processor:
   generate, by the route processing node, from a first version of a particular route indicated in the RIB, a second version of the particular route, wherein the second version is included in the FIB, and wherein the second version of the particular route is generated by applying a second rule obtained programmatically at the connectivity service, wherein the second rule indicates (a) a second matching criterion for applying the second rule and (b) a second mutation to be applied to the second version; and
   causing, by the route processing node, the second version to be transmitted from the transit gateway to a routing metadata recipient external to the transit gateway.

18. The non-transitory computer-accessible storage medium as recited in claim 16, storing further program instructions that when executed on the processor:
   cause to be presented, via a programmatic interface, an indication of one or more fields of routing metadata to which mutations are permitted via rules obtained programmatically at the connectivity service, and wherein results of applying individual ones of the mutations are included in the RIB.

19. The non-transitory computer-accessible storage medium as recited in claim 16, storing further program instructions that when executed on the processor:
   cause to be presented, via a programmatic interface, an indication of one or more fields of the RIB to which mutations are permitted via rules obtained programmatically at the connectivity service, and wherein results of applying individual ones of the mutations are included in the FIB.

20. The non-transitory computer-accessible storage medium as recited in claim 16, wherein the first matching criterion indicates one or more of: (a) a property of a route prefix, (b) an identifier of a network of the plurality of networks, (c) an identifier of a routing information source, (d) an attachment category of a plurality of attachment categories which can be used to programmatically attach a network of the plurality of networks to the transit gateway, (e) a Border Gateway Protocol (BGP) attribute, or (f) a network address of a participant in a routing information exchange session.

* * * * *